(12) United States Patent
Hayes et al.

(10) Patent No.: US 10,627,831 B2
(45) Date of Patent: Apr. 21, 2020

(54) FLEET VEHICLE FEATURE ACTIVATION

(71) Applicant: Allstate Insurance Company, Northbrook, IL (US)

(72) Inventors: Howard Hayes, Glencoe, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 174 days.

(21) Appl. No.: 15/247,018

(22) Filed: Aug. 25, 2016

(65) Prior Publication Data
US 2018/0059687 A1    Mar. 1, 2018

(51) Int. Cl.
*G05D 1/02* (2020.01)
*G08G 1/0968* (2006.01)
(Continued)

(52) U.S. Cl.
CPC ......... *G05D 1/0291* (2013.01); *G01C 21/343* (2013.01); *G01C 21/3407* (2013.01); *G01C 21/3415* (2013.01); *G01C 21/3469* (2013.01); *G01C 21/3492* (2013.01); *G01C 21/3605* (2013.01); *G01C 21/3691* (2013.01); *G05D 1/0005* (2013.01); *G05D 1/0022* (2013.01); *G05D 1/0027* (2013.01);
(Continued)

(58) Field of Classification Search
CPC .............. G01C 21/3415; G01C 21/343; G01C 21/3469; G05D 1/0291
See application file for complete search history.

(56) References Cited

U.S. PATENT DOCUMENTS 6,339,745 B1   1/2002 Novik
6,892,131 B2   5/2005 Coffee et al.
(Continued)

FOREIGN PATENT DOCUMENTS

WO   2013158083 A1   10/2013
WO   2016122881 A1   8/2016

OTHER PUBLICATIONS

May 2, 2016—"Fleet Insurance for Commercial Vehicles and Road Safety," Arrive Alive South Africa, retrieved May 2, 2016, https://arrivealive.co.za/Fleet-Insurance-for-Commercial-Vehicles-and-Road-Safety.
(Continued)

*Primary Examiner* — Michael D Lang
(74) *Attorney, Agent, or Firm* — Banner & Witcoff, Ltd.

(57) ABSTRACT

A system including a processor and memory may provide for automatically activating or deactivating a feature of a fleet vehicle. For example, one or more fleet vehicles may include one or more of a global-positioning system, a speed governor, electronically-controlled brakes, an electronically-controlled accelerator, a speed limiter, or an on-board computer with a processor and memory. One or more features may be activated by a local or remote computing device or system. For example, a system may determine one or more recommended routes between two or more locations. The system may track a fleet vehicle's progress along a route, and activate a feature of the fleet vehicle based on the fleet vehicle following or not following the recommended route. For example, the system may cause activation of a speed limiter on the fleet vehicle, disable the fleet vehicle, and/or activate or deactivate autonomous features of the fleet vehicle.

20 Claims, 15 Drawing Sheets

(51) Int. Cl.
  *G08G 1/00* (2006.01)
  *G01C 21/34* (2006.01)
  *G01C 21/36* (2006.01)
  *G05D 1/00* (2006.01)

(52) U.S. Cl.
  CPC ......... *G05D 1/0214* (2013.01); *G05D 1/0217* (2013.01); *G05D 1/0223* (2013.01); *G08G 1/096816* (2013.01); *G08G 1/096822* (2013.01); *G08G 1/096844* (2013.01); *G08G 1/202* (2013.01)

(56) References Cited

U.S. PATENT DOCUMENTS

| | | | |
|---|---|---|---|
| 7,937,278 B1 | 5/2011 | Cripe et al. | |
| 8,280,752 B1 | 10/2012 | Cripe et al. | |
| 8,332,242 B1 | 12/2012 | Medina, III | |
| 8,606,512 B1 | 12/2013 | Bogovich et al. | |
| 8,812,330 B1 | 8/2014 | Cripe et al. | |
| 8,996,303 B1 | 3/2015 | Bogovich et al. | |
| 9,020,751 B1 | 4/2015 | Bogovich et al. | |
| 9,081,650 B1 | 7/2015 | Brinkmann et al. | |
| 9,141,995 B1 | 9/2015 | Brinkmann et al. | |
| 9,361,599 B1 | 6/2016 | Biemer et al. | |
| 9,390,452 B1 | 7/2016 | Biemer et al. | |
| 2006/0220906 A1 | 10/2006 | Nakaoka | |
| 2006/0238340 A1 | 10/2006 | Harvey | |
| 2009/0281717 A1 | 11/2009 | Nambata | |
| 2014/0358353 A1* | 12/2014 | Ibanez-Guzman | G05D 1/0027 701/23 |
| 2015/0206355 A1 | 7/2015 | Hubbard et al. | |
| 2016/0086285 A1 | 3/2016 | Jordan Peters et al. | |
| 2016/0167652 A1 | 6/2016 | Slusar | |
| 2016/0169690 A1 | 6/2016 | Bogovich et al. | |
| 2016/0171521 A1 | 6/2016 | Ramirez et al. | |
| 2016/0171621 A1 | 6/2016 | Bogovich et al. | |
| 2016/0189305 A1 | 6/2016 | Bogovich et al. | |
| 2016/0189306 A1 | 6/2016 | Bogovich et al. | |
| 2016/0189307 A1 | 6/2016 | Bogovich et al. | |
| 2016/0189308 A1* | 6/2016 | Bogovich | G06Q 40/08 705/4 |
| 2017/0140293 A1* | 5/2017 | Vij | G06N 7/005 |
| 2017/0267170 A1* | 9/2017 | Be | B60Q 9/00 |

OTHER PUBLICATIONS

2006—Chen, Samantha et al., "Assessing Crash Risks on Curves," Centre for Accident Research and Road Safety Queensland, Queensland University of Technology et al., http://eprints.qut.edu.au/6359/1/6359.pdf.

May 5, 2016—Merchants Fleet Management, "Fleet Insurance: A partner you can count on", retrieved May 5, 2016 http://www.merchantsfleetmanagement.com/fleet-solutions/fleet-insurance.

May 5, 2016—"Fleet Management—Bridle Insurance," retrieved May 5, 2016, http://www.bridleinsurance.co.uk/fleet-management.html.

Nov. 13, 2017—(WO) International Search Report—PCT/US17/048638.

* cited by examiner

FLEET VEHICLE FEATURE ACTIVATION

BACKGROUND

Drivers today have many choices for various routes from a location to a destination. Systems exist for assisting drivers in determining how to get from one place to another. For example, some devices provide turn-by-turn directions to drivers, and other devices alert drivers about points of interest along a travel path. Nevertheless, there remains a need for improved technological systems for guiding drivers to a destination.

SUMMARY

The following summary is for illustrative purposes only, and is not intended to limit or constrain the detailed description.

Aspects of the disclosure provide effective, efficient, and convenient technical solutions that address and overcome the technical problems associated with activating or deactivating a feature of a fleet vehicle. Specifically, aspects of the disclosure relate to devices for determining, based on one or more factors, whether a fleet vehicle is following a recommended route between two or more locations. Based on whether the vehicle is following or not following the recommended route, a system or device may cause one or more features of the vehicle to be activated or deactivated. For example, a fleet management system that includes a processor and memory may receive location information from a global positioning system in the fleet vehicle. Based on the location information of the fleet vehicle, the fleet management system may cause activation or deactivation of a feature of the fleet vehicle based on whether the fleet vehicle is following or not following the recommended route. The feature of the fleet vehicle that is activated or deactivated may be an autonomous or semi-autonomous function of the vehicle. The feature may, for example, be one or more of a speed limiter, a brake, an accelerator, and/or a radio. In some aspects, the fleet vehicle may be turned or caused to follow a particular route (e.g., a self-driving function may be activated that returns the vehicle to the recommended route). In some embodiments, the fleet vehicle may be disabled.

The system may further determine a recommended route based on one or more factors. The system may use a weighting of one or more factors to determine the recommended route.

Furthermore, one or more factors specific to a fleet vehicle may be used in determining a recommended route. For example, a fleet of vehicles may include more than one vehicle (e.g., two, twenty, two hundred, two thousand, etc.). A particular factor in a recommended route might not matter to an individual (e.g., saving three minutes or saving insurance cost in a pay-as-you-drive model on a trip by choosing one route over another), but when aggregated over a fleet of multiple vehicles collectively making many trips each day, week, month, or year, small differences in efficiency (e.g., maximizing efficiency), or considering other factors in recommending routes, may add up to a large difference in time saved, money made, money saved, or other benefits to a fleet owner. Thus, the system may consider one or more factors associated with a fleet vehicle (e.g., risk of a route for a particular fleet vehicle type on a particular route segment based on historical or real-time data) in order to determine a recommended route.

In accordance with one or more embodiments, a system, computer-readable media, device, and/or apparatus may be configured to perform a method that includes determining, by a computing device including a processor and memory, a driving route of the fleet vehicle from a starting location to a destination location, receiving, by the computing device, from a global positioning system device in the fleet vehicle, route information of the fleet vehicle indicating that the fleet vehicle is no longer at the starting location and is along the driving route, determining, by the computing device, that a feature of the fleet vehicle is deactivated, and after receiving the route information of the fleet vehicle and determining that the feature of the fleet vehicle is deactivated, causing, by the computing device, activation of the feature of the fleet vehicle.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
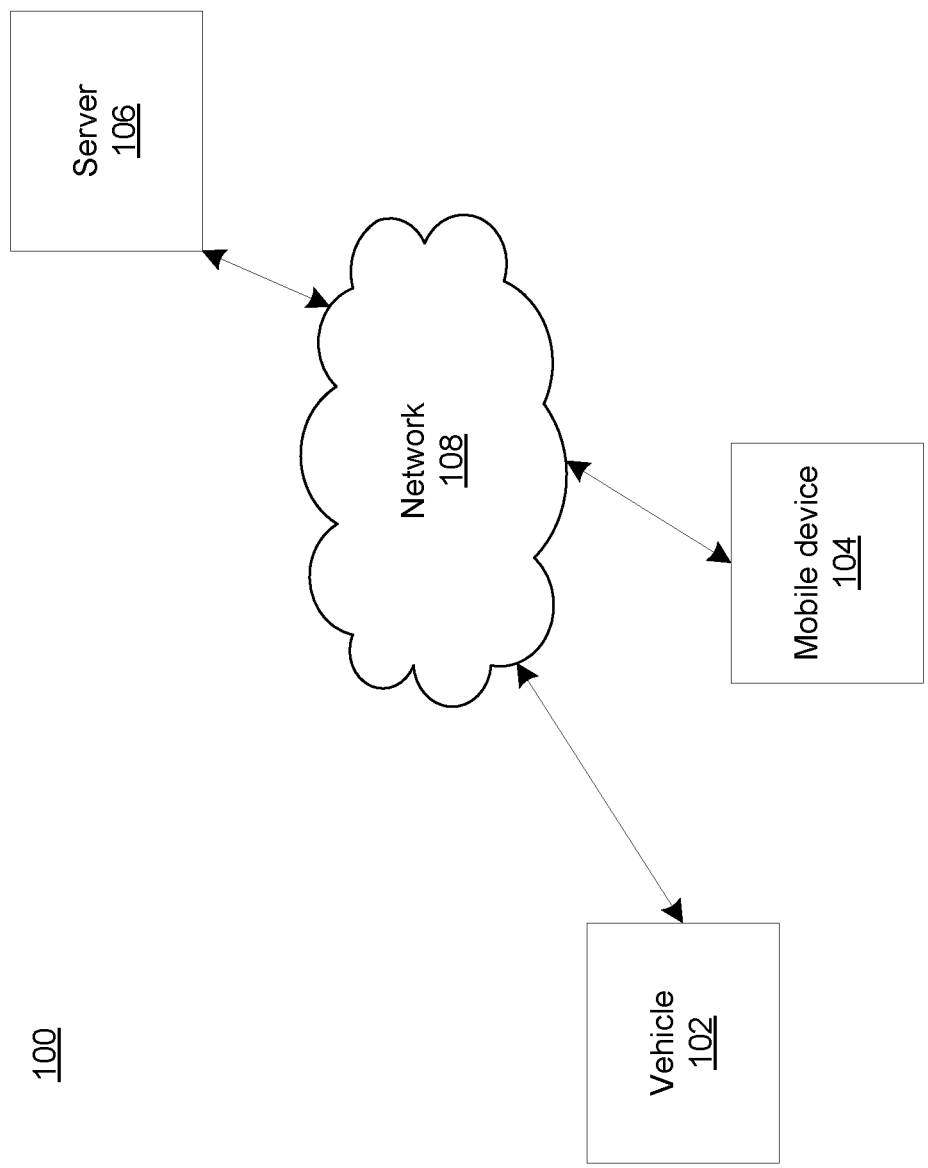
FIG. 1 is an illustrative diagram of an environment in which a feature of a vehicle may be activated or deactivated according to at least one embodiment described herein.

FIG. 1 depicts an illustrative block diagram of a computing environment in accordance with some features described herein. It is noted that various connections between elements are discussed in the following description. It is noted that these connections are general and, unless specified otherwise, may be direct or indirect, wired or wireless, and that the specification is not intended to be limiting in this respect.

A computing environment (e.g., computing environment 100) may include a vehicle (e.g., vehicle 102), a mobile device (e.g., mobile device 104), and/or a server (e.g., server 106). Vehicle 102 may include a computing device.

In one or more arrangements, one or more of a computing device included in vehicle 102, mobile device 104, and server 106 may be any type of computing device capable of receiving, generating, and/or displaying a user interface, receiving input via the user interface, and communicating the received input to one or more other computing devices. For example, a computing device included in vehicle 102, mobile device 104, and/or server 106 may, in some instances, be and/or include server computers, desktop computers, laptop computers, tablet computers, smart phones, personal digital assistants, pagers, or the like. Any and/or all of a computing device included in vehicle 102, mobile device 104, and/or server 106 may, in some instances, be or include special-purpose computing devices configured to perform specific functions.

Computing environment 100 also may include one or more networks, which may interconnect one or more of vehicle 102, mobile device 104, and server 106. For example, computing environment 100 may include network 108, as depicted in FIG. 1. Network 108 may include one or more sub-networks (e.g., local area networks (LANs), wide area networks (WANs), or the like). Network 108 may be associated with a particular organization (e.g., a corporation, educational institution, governmental institution, or the like) and may interconnect one or more computing devices associated with the organization. Network 108 may be a home network, a corporate network, an ad-hoc network, a ring network, a cellular network, or another type of network. Network 108 may be the Internet.

Figure 2:
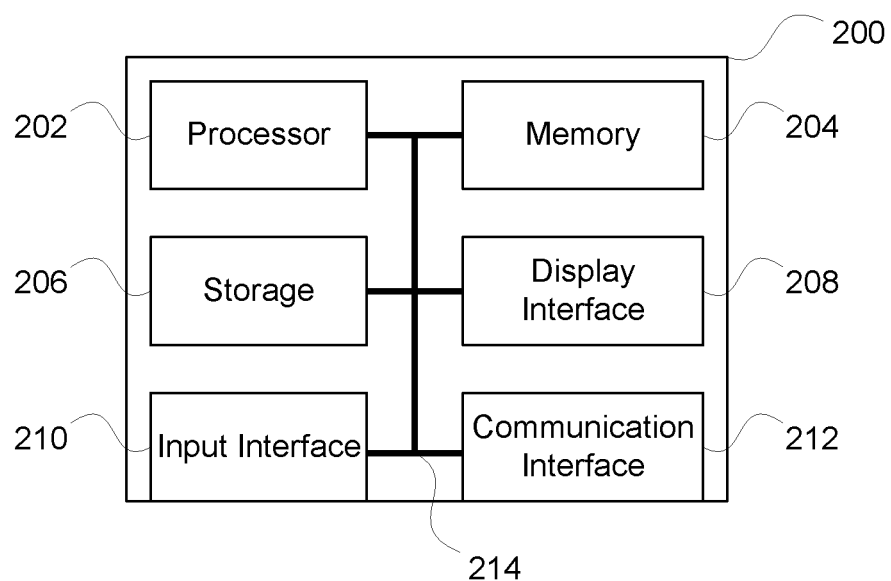
FIG. 2 is an illustrative block diagram of a system that may be used in determining whether to activate or deactivate a vehicle feature according to at least one embodiment described herein.

FIG. 2 illustrates computing device 200, which may be similar to mobile device 104, server 106, and/or a computing device in vehicle 102. Computing device 200 may include one or more processor(s) 202, memory(s) 204, storage(s) 206, display interface(s) 208, input interface(s) 210, and communication interface(s) 212. A data bus (e.g., data bus 214) may interconnect processor(s) 202, memory(s) 204, storage(s) 206, display interface(s) 208, input interface(s) 210, and communication interface(s) 212. Communication interface(s) 212 may be a network interface configured to support communication between computing device 200 and one or more devices and/or networks. Communication with other devices via communication interface(s) 212 may be direct (e.g., using BLUETOOTH, near-field communication (NFC), WIFI, AIRDROP, or the like) or indirect (e.g., via one or more other devices).

Memory(s) 204 and/or storage(s) 206 may include a hard drive, solid state drive, flash memory, random-access memory (RAM), read-only memory (ROM), removable storage, NFC tag, or the like. Memory(s) 204 may include one or more program modules having instructions that, when executed by processor(s) 202, cause computing device 200 to perform one or more functions described herein and/or one or more databases that may store and/or otherwise maintain information that may be used by such program modules and/or processor(s) 202. In some instances, the one or more program modules may be stored by and/or maintained in different memory units of computing device 200 and/or by different devices that may form and/or that are connected to or in communication with computing device 200. For example, the instructions may include instructions that cause computing device 200 to execute a computer-executable application that receives, processes, and stores data received from one or more computing devices.

Display interface(s) 208 may include a display output port (e.g., analog video, digital video, VGA, HDMI, Display-Port), and/or a connection to an internal or external display. Input interface(s) 210 may include one or more ports for receiving input via a keyboard, mouse, stylus, touchpad, touchscreen, or other input device. Input interface(s) 210 may be integrated with or otherwise correspond with display interface(s) 208 (e.g., such as in a touch, multi-touch, or similar environment).

Figure 3:
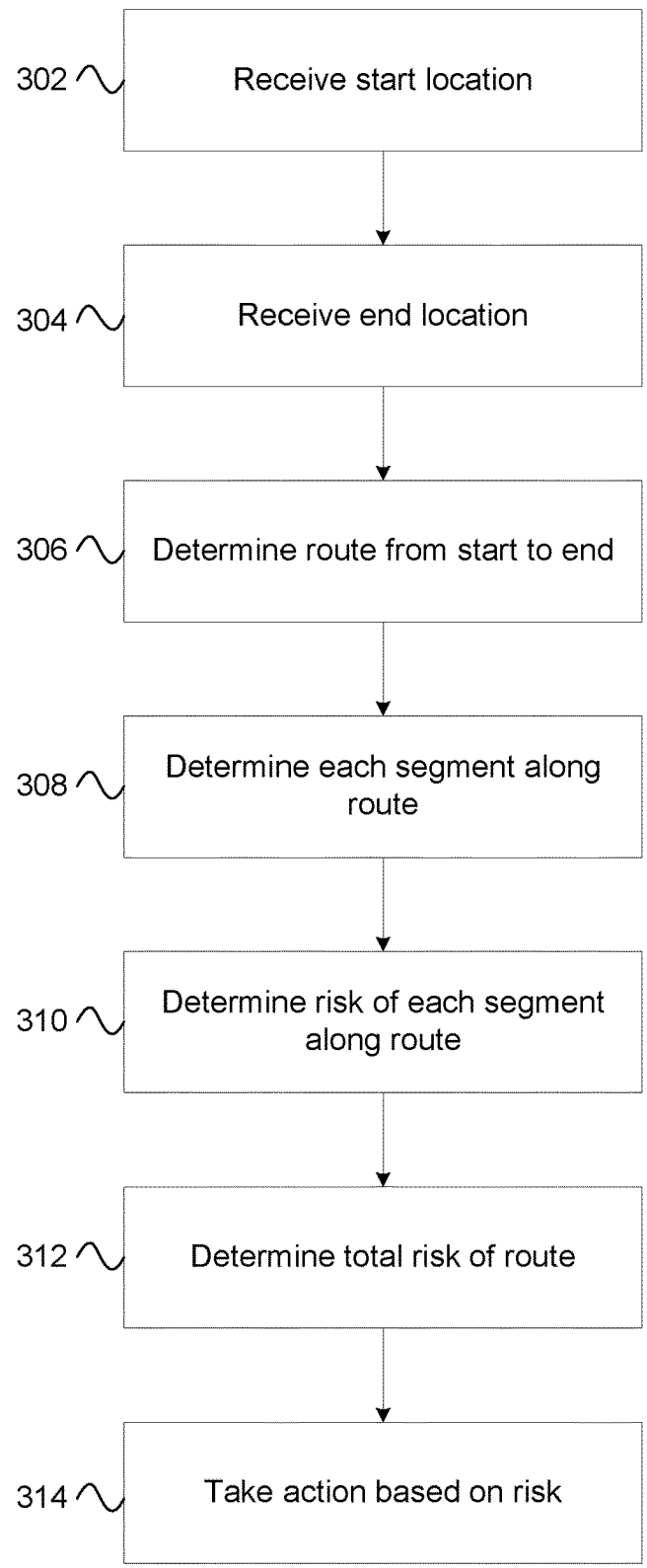
FIG. 3 is an illustrative flow diagram according to at least one embodiment described herein.

FIG. 3 depicts an illustrative flow diagram of a method of determining whether to activate or deactivate a vehicle feature for one or more vehicles. The vehicles described in connection with this application may be fleet vehicles, or may be non-fleet vehicles.

In step 302, a system may receive a start location. The start location may include a global positioning system (GPS) location, latitude/longitude, geographic coordinates, an address, or the like. The start location may be determined using a GPS device, a computing device, a mobile phone, a vehicle navigation system, a device with a geographic information system (GIS), or the like. The start location may be a location of a vehicle, a person, a computing device, a building, an address, a point on a map, or the like.

In step 304, a system may receive an end location. For example, the end location may include a destination that a user may wish to go to. For example, if a user is at the start location, and wishes to drive to a particular destination, the user may enter the destination (e.g., end location) into a computing device, mobile phone, GPS device, vehicle navigation system, or the like. The system may automatically determine the end location, based on a series of destinations to be visited, a series of tasks to be performed, or the like. For example, if a driver is to pick up or deliver items at a number of locations on the way to the destination location, a start location may be a current location of the driver, and the end location may be the next location to which the driver is to go. The system may receive the start and/or end location from a system that determines a route for the driver to follow. Alternatively or additionally, the system may determine the start and/or end location.

In step 306, the system may determine a route from the start location to the end location. In step 308, the system may determine a number of segments along the route from the start location to the end location.

In step 310, the system may determine a risk of each segment along the route. The system may determine risk based on one or more factors. The risk may be represented using, for example, a risk score, a dollar amount, or another numeric representation. Alternatively or additionally, the risk may be represented graphically, visually, or the like.

Figure 4:
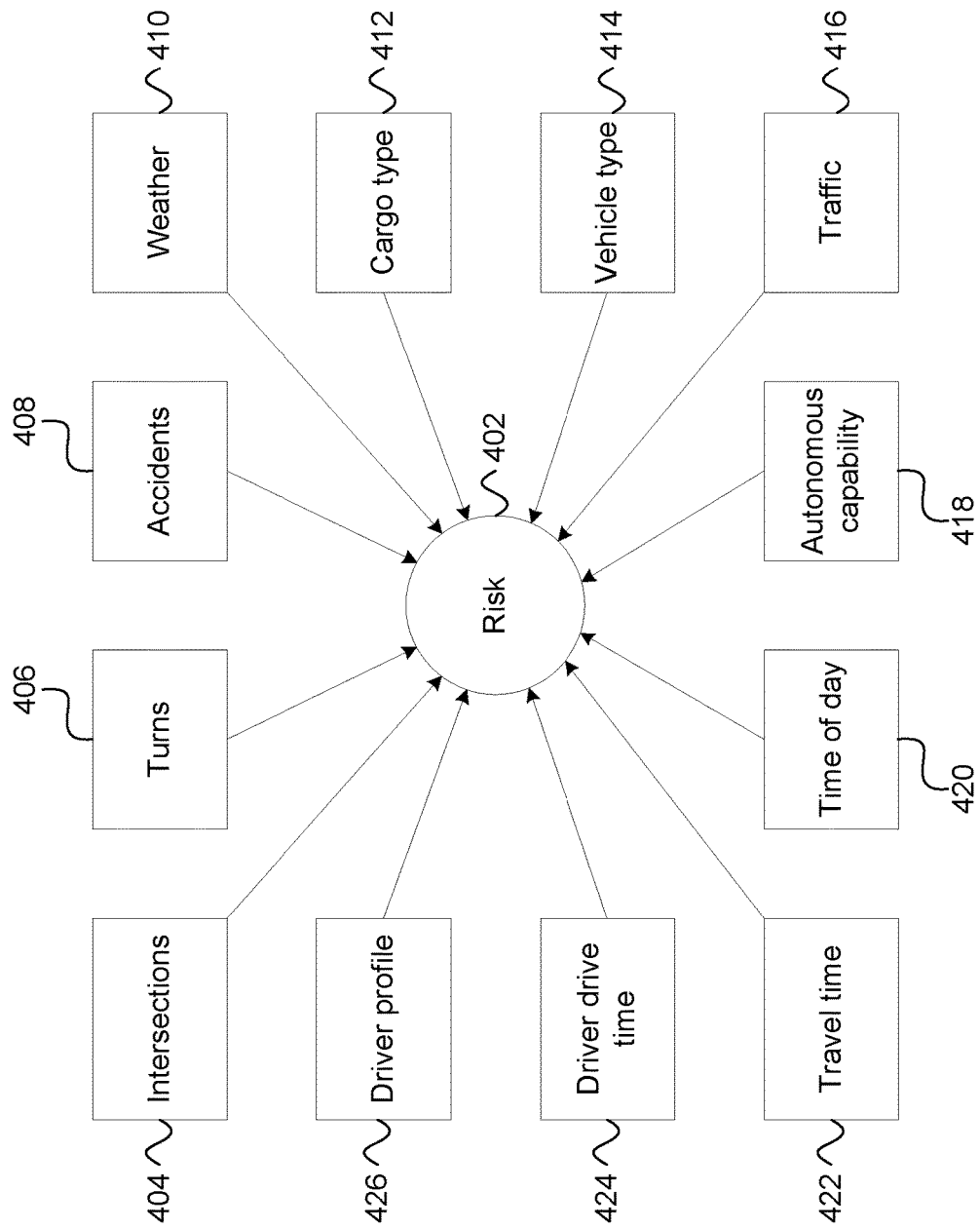
FIG. 4 is an illustrative block diagram of one or more factors that may be used for determining whether to activate or deactivate a vehicle feature according to at least one embodiment described herein.

The risk may be determined based on one or more factors. For example, FIG. 4 depicts a number of factors, one or more of which may be used for determining the risk (e.g., risk 402). The system may use one or more of the factors in FIG. 4. The factors depicted in FIG. 4 are merely illustrative, and the system may use factors different than or in addition to those depicted.

In some embodiments, risk may be determined based on a weighted score. The system may use one or more system preferences, fleet preferences, owner preferences, driver preferences, or the like to determine weights to apply to different factors when determining risk. The system may apply weights based on mathematical or actuarial determinations of risk and the factors that might contribute to risk in different situations. Thus, the system may apply different weights depending on different factors. The weight for each factor may be selected based on which factors are included in the risk calculation.

For example, a risk factor may include intersections 404. For example, the risk may be based on a number of intersections, risk of one or more of the intersections along the route (e.g., a more or less risky intersection), and the like.

A risk factor may include turns 406. For example, the risk may be based on a number of turns, whether the turns are right or left turns, the number of lanes turning, and the like.

A risk factor may include accidents 408. For example, accidents may include a number of accidents along a segment, a frequency of accidents along a segment, or the like. The accidents risk may take into account additional variables. For example, if red vehicles get into accidents on the segment at a different rate than black vehicles, then the contribution of accidents 408 to risk 204 may be different for a red vehicle than for a black vehicle.

A risk factor may include weather 410. The weather could be current weather, past weather, and/or future weather. The risk could be based on a predicted weather for a predicted time that the vehicle will be on a particular segment. For example, given a particular starting location, a predicted travel time (e.g., based on current traffic conditions, speed limits, vehicle capability, required stops, etc.), a time could be determined at which the vehicle is predicted to be at a particular segment. The weather prediction for the time that the vehicle is at the particular segment may be used for determining the risk. Alternatively (e.g., if a predicted time is not available), historical weather information may be used for predicting the weather. For example, if a particular road segment (e.g., in the mountains) is often snowy in December, and the month of the determining risk is December, a prediction may be made that the trip might happen in December, and therefore a risk may be determined based at least in part on a prediction that the road segment in the mountains might be snowy, based on historical weather information.

A risk factor may include cargo type 412. A cargo type being transported in the vehicle may impact risk. Different types of risk may exist based on the types of cargo. For example, risks may exist to the driver, to passengers, to the vehicle itself, to the road, to other drivers or vehicles, to the environment, or the like. For example, a school bus might have different amounts or types of risk than a truck transporting lumber, which might have different amounts or types of risk than a truck transporting cash, which might have different amounts or types of risk than an ambulance transporting a patient. Characteristics of different segments of road along a particular route may contribute to risk of a particular cargo type.

The system may be pre-programmed with factors that are relevant to types of risk relevant to cargo transported within the fleet. For example, a fleet of vehicles meant for delivering packages may, in determining risk based on cargo type 412, take into account factors that could contribute risk to the types of cargo being carried in the vehicles (e.g., packages). A different fleet of vehicles (e.g., school buses), may take into account different factors that result in different risk calculations based on what is being transported in the vehicles (e.g., school children). For example, a package delivery truck route might prioritize efficiency and speed in stopping at different homes or businesses to deliver packages, and therefore calculate risk based on factors related to those priorities (e.g., risk of late delivery). A school bus route might similarly prioritize speed and efficiency in picking up or dropping off school children, but might also prioritize avoiding busy or wide roads, to increase safety for children crossing the road before getting on or after getting off the bus.

A risk factor may include vehicle type 414. Similarly to what was discussed above, the type of vehicle may also be a factor in determining risk, and may impact the amount of risk that is determined. For example, an armored truck might have less risk than a papier-mâché parade float (e.g., because the armored car may be more resistant to damage than the parade float). The value of the vehicle may also impact the risk based on the vehicle type. For example, an expensive car may be more risky than a cheap car, based on the value of the vehicle. The capabilities of the vehicle may also impact the risk based on the vehicle type. For example, a fast sports car may be more risky than a sedan.

A risk factor may include traffic 416. For example, traffic may include information regarding current traffic, predicted traffic, historical traffic patterns, and the like. For example, if traffic on a typical route is often heavy, then there might be more risk associated with that route than a route where there is typically not a lot of traffic.

A risk factor may include autonomous capability 418. For example, some autonomous capabilities (e.g., self-driving, self-braking, self-speed control, automatic lane control, and the like) may require that a road segments include certain technology (e.g., sensors, cameras, lights, transmitters, paint with particular characteristics, or the like) in order for the autonomous capabilities to be available. Alternatively or additionally, autonomous features might only be available on a particular route—or might be prescribed or proscribed on a particular route—based on legislative or other legal requirements. The system may determine that driving on a particular route or segment is more or less risky, based on the availability of or requirement for one or more autonomous features on that route or segment.

A risk factor may include time of day 420. For example, driving at certain times of the day may be more risky than driving at different times of the day. For example, trips may be more risky on a particular route based on increased traffic, an increased number of historical accidents at a time of the day, increased driver fatigue (e.g., driving at night versus driving during the day), and the like. Time of day may be considered in combination with other factors (e.g., traffic, weather, etc.). The system may provide an estimated risk for different times of the day (e.g., now, in one hour, etc.), and/or may provide a time that the risk would be lowest (e.g., to minimize risk, begin the trip at 3:00 PM (whatever time is the lowest risk)).

A risk factor may include travel time 422. For example, the risk of a trip might increase or decrease depending on the projected length of time to complete the trip. In some embodiments, if the length of the trip is above a threshold, the risk may increase or decrease by a particular amount (e.g., trips over 24 hours might be more risky than trips less than 24 hours). In some embodiments, if the length of the trip is below a threshold, the risk may increase or decrease by a particular amount. In some embodiments, the risk increase proportionally with the length of the trip.

A risk factor may include driver drive time 424. For example, if a particular driver has been driving for a number of hours recently (e.g., six hours of the last 24 hours), there may be a higher risk than if the driver has not been driving as much. Furthermore, some jurisdictions may limit the number of hours that a driver (e.g., taxi driver, truck driver, etc.) may drive in a period of time (e.g., 24 hours). Some routes may involve more or less drive time than others, may have more or fewer rest areas on the route, and/or may involve more or less risk based on the amount of driver recent drive time. The system may therefore consider the amount of driver drive time 424 in determining risk (e.g., risk 402).

A risk factor may include driver profile 426. For example, some drivers may be more risky than other drivers. Some drivers may be more risky at certain times, and less risky at other times (e.g., if a driver has a more difficult time seeing at night, but is otherwise a more defensive driver, that driver might have a more risky nighttime driving profile, but a less risky daytime driving profile). A driver may have a driver score (e.g., a safety score).

As noted earlier, one or more factors may be used in determining risk (e.g., risk 402). One of skill in the art will recognize additional risk factors that may be used, and relevant considerations that may be applicable in using those factors for determining risk.

For example, a risk factor may include vehicle health. Vehicle health may be determined, for example, based on an on-board diagnostics system. The on-board diagnostics system may determine one or more functions of the vehicle, conditions of parts of the vehicle, or the like. Based on the determinations of the on-board diagnostics system, a vehicle health score may be determined. For example, the on-board diagnostics system may transmit diagnostic information to a computing device remote from the vehicle (e.g., mobile device 104, server 106). The computing device remote from the vehicle may determine the vehicle health score. Alternatively or additionally, the on-board diagnostics system may analyze the diagnostic information of the vehicle, and determine the vehicle health score. The on-board diagnostics system may transmit the vehicle health score to a computing device remote from the vehicle (e.g., mobile device 104, server 106).

Returning to FIG. 3, in step 312, the system may determine a total risk of the route. The system may determine the total risk of the route in a risk optimization equation. The system may determine a total risk of the route based on the risk of one or more segments along the route. In some embodiments, there may only be one segment, which may result in the risk of the segment being the same as the total risk of the route. Alternatively, in some embodiments, there may be multiple segments in a route. The total risk of the route may be the sum of the different segments of the route, or the total risk of the route may be more or less than the sum of the different segments of the route. For example, two segments may have individual risks of a particular amount, but when those two segments are taken together in the same trip, the total risk may be more or less than the sum of the risk of the two segments individually.

In step 314, the system may take one or more actions based on the total risk of the route. For example, the system may activate a vehicle feature, deactivate a vehicle feature, send an alert, provide an incentive, provide a notification, or the like.

As noted, in some embodiments, the system may activate and/or deactivate a vehicle feature based on one or more factors other than risk. For example, the system may activate and/or deactivate the vehicle feature based on whether the vehicle is following or not following the recommended route. The system may cause the activation and/or deactivation of the vehicle feature by transmitting, via a network (e.g., a cellular network), to a computing device on or in the vehicle, an instruction or command to activate or deactivate the feature of the vehicle.

In some embodiments, the system may have a human controller who, when alerted based on, for example, an on-board fleet vehicle diagnostics system, may choose to control a certain feature to be activated or deactivated. The system may use vehicle to infrastructure (V2I) communication or infrastructure to vehicle (I2V) protocol for public safety to identify scenarios in which and/or a network (e.g., wireless network) over which to send a signal to activate or deactivate the feature of the vehicle.

For example, activating or deactivating the feature of the vehicle may include one or more of activating/de-activating a speed limiter of the fleet vehicle (e.g., activating/de-activating a device that limits a rotational speed of an engine of the fleet vehicle), activating/de-activating a brake of the fleet vehicle, activating/de-activating an accelerator of the fleet vehicle, turning the wheels of the fleet vehicle, staying in a lane or changing lanes, turning on/off hazard lights of the fleet vehicle for a certain segment(s) of the route, turning on/off wipers of the fleet vehicle, turning on/off traction control feature of the fleet vehicle, turning on/off safety cameras of the fleet vehicle, turning on/off headlights of the fleet vehicle, turning on/off a radio of the fleet vehicle, activating/de-activating a radio control, activating/de-activating a self-driving function of the vehicle, activating/de-activating a self-parking feature of the vehicle, and/or disabling the vehicle. The vehicle feature may be an autonomous or semi-autonomous feature of the vehicle.

In one example, the system may determine if the vehicle has reached the end destination of the vehicle. If the vehicle has reached the destination, the system may cause a self-parking feature of the vehicle to be enabled or activated. The self-parking feature may automatically park the vehicle in an available parking spot at or near the destination.

In some aspects, if the total risk of the route is too high, the system may disable the vehicle. For example, if there is a snowstorm in the area, and 18 inches of snow on the ground, the vehicle may be deactivated until the snow is cleared. In another example, if the risk of a route is within a particular range, the system may activate a speed limiter on the vehicle, to prevent the vehicle from going over a certain speed. For example, if there is a snowstorm, and there is one inch of snow on the ground, the vehicle may be limited to not driving over a certain speed (e.g., 40 miles per hour), and/or limited from accelerating or decelerating above or below a certain rate.

In another example, if the risk of a route is at a particular level, an autonomous feature of the vehicle may be activated. For example, if autonomous driving (e.g., a self-driving vehicle) is only available on routes that have risk below a certain level, and the risk of the route is below the level, then autonomous driving may be activated or made available to be activated (e.g., the option is given to the driver). Alternatively, in a different example, autonomous driving might be required on routes that have risk above a certain level. Thus, if the risk is above the level, then autonomous driving might be activated, and operating the vehicle other than by the autonomous functionality might be de-activated. Thus, in some embodiments, a combination of vehicle features might be activated and/or deactivated in response to the risk of the route.

The amount of risk in response to which action is taken may be different depending on the action. For example, the system may take one action if the risk is above a particular threshold, and/or take a different action if the risk is below a same or different threshold. Furthermore, different thresholds may be used depending on different factors. For example, a type of vehicle may impact an acceptable amount of risk. For example, the system may take action for a car if the risk is at a first threshold, whereas the system may take the action for a truck if the risk is at a second threshold. Thus, the system may take different actions for different vehicles based on different thresholds.

In another example, a type of cargo may result in a different response to risk. For example, an action for an ice cream truck might be taken at a first threshold, whereas an action for a truck carrying blocks of wood might be taken at a second threshold. Further still, an action for a school bus might be taken at a third threshold, while an action for a truck carrying nuclear waste might be taken at a fourth threshold. An action for a heating-and-cooling related vehicle might be taken at a fifth threshold. Some vehicles might be allowed to take less risk than other vehicles (e.g., a vehicle carrying hazardous risk materials is allowed to take less risk than a vehicle carrying lumber).

The system may use one or more factors to evaluate the risk. In addition to considering factors individually, the system may consider factors in combination. For example, a truck turning at an intersection might have different risk than a car turning at the intersection.

Alternatively or additionally, the system may use one or more factors to evaluate or determine what action to take in response. Some factors might be dispositive, whereas other factors might be considered in combination. For example, if a road segment is snowy, a speed of the vehicle may be limited (e.g., snow less than six inches, vehicle is limited to less than 40 miles per hour). If the road is snowy above a particular threshold (e.g., equal to or greater than six inches of snow), vehicle is disabled and/or not allowed to be taken on that segment of road.

Furthermore, a chosen risk threshold for a particular action might be dependent on one or more factors relative to a fleet of vehicles. For example, the purpose of the fleet might be considered in determining a threshold for taking an action.

The system may repeat one or more of the steps of FIG. 3 in determining a route. For example, the system may determine, in step 306, multiple routes from the start location to the end location. The system may determine, in step 308, segments of each of the routes, and in steps 310 and 312, the risk of the segments and the total risk of each route. The system may recommend a particular route. In step 314, the system may take action based on a selected and/or recommended route, (e.g., rather than every possible route).

Figure 5:
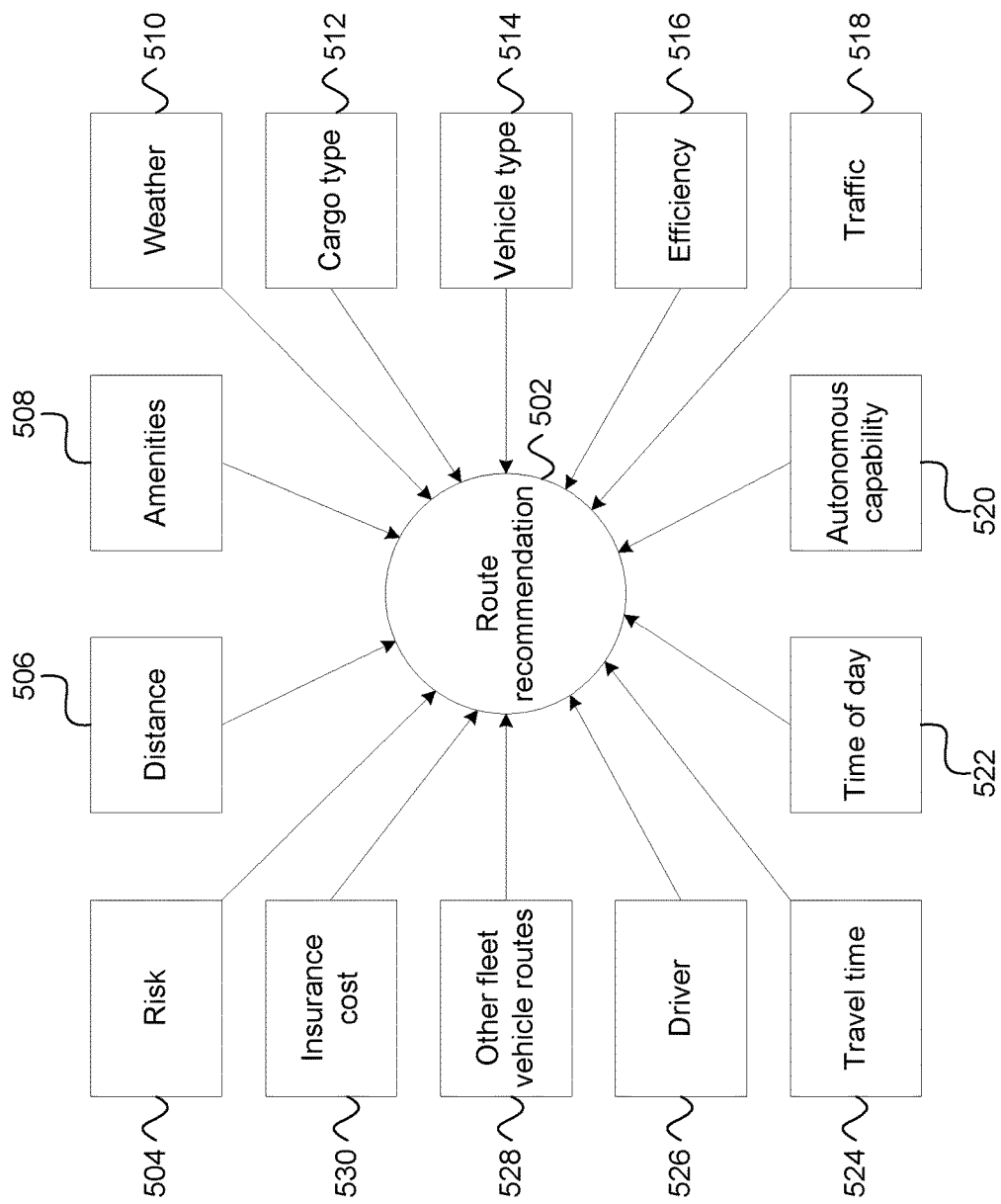
FIG. 5 is an illustrative block diagram of one or more factors that may be used for determining a recommended route according to at least one embodiment described herein.

FIG. 5 depicts an illustrative diagram of one or more factors that the system may use in determining a route recommendation (e.g., route recommendation 502). The system may provide a route recommendation when there are multiple possible routes from the start location to the end location. In some embodiments, the system may use one or more factors in providing a route recommendation. The factors illustrated in FIG. 5 are merely illustrative, and other factors may be used instead of or in addition to the factors illustrated in FIG. 5. Thus, the system may use data and algorithms that would allow for the inclusion of one or more factors in determining a route recommendation.

Some factors may be normalized to provide for a beneficial analysis. For example, if a risk is measured in a risk score, and efficiency is measured as a percentage, and number of hours that a driver is driving is measured as a number of hours, then it may be difficult for a system to determine, based on the different types of measuring each factor, which route would be most preferential. By contrast, if the factors are normalized (e.g., each factor's score is converted to a standardized unit—e.g., a dollar amount), then the factors may easily be combined for determining a recommended route, an amount of risk, etc. For example, a risk may be converted to or measured in a dollar amount, based on a dollar amount of risk that may correspond to driving a particular route. As other examples, an amount of wear and tear on a vehicle, a fuel cost, an amount of drive time as a percentage of the legal number of hours the driver is allowed to drive each day, and in view of the driver's daily wage, a cost of overtime, and the like, may be converted to a dollar amount. Thus, by normalizing each factor, the factors may be combined and compared to determine a route recommendation.

The system may use risk 504 in determining route recommendation 502. The system may use the cost of risk or a risk score in determining route recommendation 502.

The system may use distance 506 in determining route recommendation 502. For example, the system may consider the total distance of the route. If a first route is a first distance, and a second route is a second distance, the system may recommend a route that is a shorter distance, or alternatively a route that is a longer distance.

The system may use amenities 508 in determining route recommendation 502. For example, amenities may include gas stations, food establishments (e.g., restaurants, convenience stores, grocery stores, and the like), auto-repair shops, air-filling stations, truck stops, car washes, rest areas, or the like. The system may consider particular service offerings of particular amenities. For example, if the vehicle uses diesel fuel, the system may consider whether a particular filling station offers diesel fuel when taking filling stations into account for route recommendation 502.

The system may consider amenities in combination with one or more other factors. For example, if a driver drive time (e.g., driver drive time 424) is high (e.g., above a threshold), the risk may increase if there are not amenities (e.g., food, shower, hotel, rest area, etc.) along a certain route.

The system may use weather 510 in determining route recommendation 502. For example, the weather could include a weather forecast, current weather, historical weather conditions, or the like. In making the route recommendation, the system could take into account travel time between the current location and a particular segment of road, and consider the weather that is forecasted to be at that particular segment of road at an approximate time the vehicle will be there. For example, if a total trip is 1000 miles long, the current weather for a segment of the trip that is 900 miles away is likely less relevant than weather in a number of hours or days, when the vehicle is predicted to be at that segment of the trip, based on the amount of time it takes to travel 900 miles. The system may recommend one route over another based on the weather conditions. For example, if one road is currently or predicted to be snowy, and another road is currently or predicted to be warm and sunny, the system might recommend the warm, sunny road. In some weather conditions, the system might not make any route recommendations, or might make a recommendation to not take a trip. For example, if every route is covered in 40 inches of snow, the system might not recommend that any trip be taken. In some embodiments, as discussed elsewhere herein, the system might take an action in response to weather. For example, the system may cause a vehicle to be disabled (e.g., if there is a lot of snow on the road).

The system may use cargo type 512 in determining route recommendation 502. For example, a truck carrying lumber might be recommended a different route than a parent taking children to a sporting event.

The system may use vehicle type 514 in determining route recommendation 502. For example, a car might receive a different recommended route than a truck. A vehicle type might be combined with other factors (e.g., amenities) to recommend a route. For example, a vehicle that gets 15 miles per gallon might be recommended a route with more amenities than a vehicle that gets 50 miles per gallon.

The system may use efficiency 516 in determining route recommendation 502. For example, efficiency may include fuel optimization (e.g., how to maximize fuel). The system may take into account a number of stops or destinations along the way. For example, for a fleet vehicle, which might need to make multiple stops along a route, the system may determine a most efficient order in which to make the stops. The system may consider a number of stoplights, number of turns, number of intersections, or other factors that may impact efficiency.

The system may use traffic 518 in determining route recommendation 502. The system may consider current traffic, predicted traffic, historical traffic patterns, or other traffic information for a particular segment or route.

The system may use autonomous capability 520 in determining route recommendation 502. Autonomous technology may include, for example, self-driving vehicles, automatic speed control, automatic lane control, automatic braking or stopping, automatic turning, automatic navigation, assistive driving technology, or other autonomous vehicle technology. Some autonomous vehicle technology may require a road to have certain technology (e.g., sensors, signal generators, etc.) installed along the roadside or under or above the pavement in order to function. Alternatively or additionally, some autonomous vehicle technology may receive satellite, cellular, wireless, or other signals, which may be obstructed or otherwise unavailable at certain sections of certain roads. Thus, if a certain autonomous vehicle technology is desired to be used, the system may consider which roads or route segments could support autonomous vehicle technology, and make a route recommendation accordingly.

The system may use time of day 522 in determining route recommendation 502. The system may use time of day alone or in combination with other factors (e.g., traffic, weather, etc.) to make a route recommendation. For example, if a first route is fastest during low traffic, but a second route is fastest during high traffic, and the time of day is a time that corresponds with low traffic, then the recommended route may be the first route. But if the time of day is a time that corresponds with high traffic, then the recommended route may be the second route.

The system may use travel time 524 in determining route recommendation 502. For example, if a first route requires a first travel time, and a second route requires a second travel time, the system may determine a route recommendation based on comparing the first travel time and the second travel time, and selecting a shorter travel time of the first travel time and the second travel time.

The system may use driver identity 526 in determining route recommendation 502. Some routes might be better for some drivers than others, and therefore the system may recommend a route based on the driver identity. For example, if a driver has a history of accidents on routes with frequent stops, the system might prefer to recommend a route without frequent stops. In another example, if a driver has a history of speeding tickets, the system might recommend a route on which a driver is less likely to get a speeding ticket. In a further example, if a driver has a particular license, qualification, or other access to a particular route or location, the system might recommend a route based on that license, qualification, or access. For example, if the driver has a military identification card, the system might recommend a route that a military identification card is required to drive on (e.g., through a military base). In some embodiments, the system may provide a driver recommendation with or instead of a route recommendation (e.g., recommend a first driver for a first route, and a second driver for a second route).

The system may use other fleet vehicle routes 528 in determining route recommendation 502. For example, the system may consider routes taken by other vehicles in a fleet in making a route recommendation. Some fleets of vehicles may experience certain benefits by having the different vehicles in the fleet follow similar routes. For example, if a fleet vehicle breaks down, another fleet vehicle could stop to help the disabled vehicle. The fleet may contract with service providers (e.g., tow trucks, repair shops, restaurants, fuel stations, and the like) along a particular route, thus receiving discounted rates or preferred services. The fleet as a whole may receive discounted insurance rates or maintenance rates for agreeing to prefer to recommend fleet vehicles take certain routes.

The system may use insurance cost 530 in determining route recommendation 502. Because insurance is paying for assumption of risk, the insurance may be based on the amount of risk. If a vehicle regularly takes trips that are more risky or less risky than the insurance premium is priced for, the insurance may be adjusted to more accurately account for the amount of risk of the trips that the vehicle regularly takes. Alternatively or additionally, some vehicles may have insurance based on the trips taken by that vehicle. That is, an insurance plan may be offered that charges a marginal amount for each trip taken and/or per mile driven by the vehicle (e.g., rather than paying a flat rate every six months or every year, a driver might pay a monthly bill, based on the trips taken the previous month). Thus, the system may determine an estimated cost of insurance (e.g., $0.011, $0.12, $1.17, etc.) for any particular trip, and/or use that estimated insurance cost in making the route recommendation.

As noted earlier, one or more factors may be used in determining a recommended route (e.g., route recommendation 502). One of skill in the art will recognize additional factors that may be used, and relevant considerations that may be applicable in using those factors for determining a recommended route.

For example, vehicle health may be used in determining a recommended route. For example, a vehicle health score may be determined by an on-board diagnostics system, or the vehicle health score may be determined based on information received from the on-board diagnostics system. The vehicle health score may include one or more different elements, which may be associated with different parts of the vehicle. For example, a fuel health score may be related to an amount of fuel in the vehicle fuel tanks, a type of fuel in the vehicle fuel tanks, or the like. An oil health score may be related to an amount of time and/or number of miles since the oil in the vehicle engine was changed, a type of oil in the engine of the vehicle, or the like. A tire health score may be related to an amount of time and/or number of miles since the tires of the vehicle were changed, an air pressure in the tires of the vehicle, a type of the tires of the vehicle, or the like. A recommended route may be different based on the vehicle health score. For example, if the air pressure in one of the tires is low, a route that includes an air-filling station may be recommended over a route that does not include an air-filling station. In another example, if the overall vehicle health score is high, a more remote route might be allowed to be recommended, while if the overall vehicle health score is low, a more remote route might not be allowed to be recommended.

Figure 6:
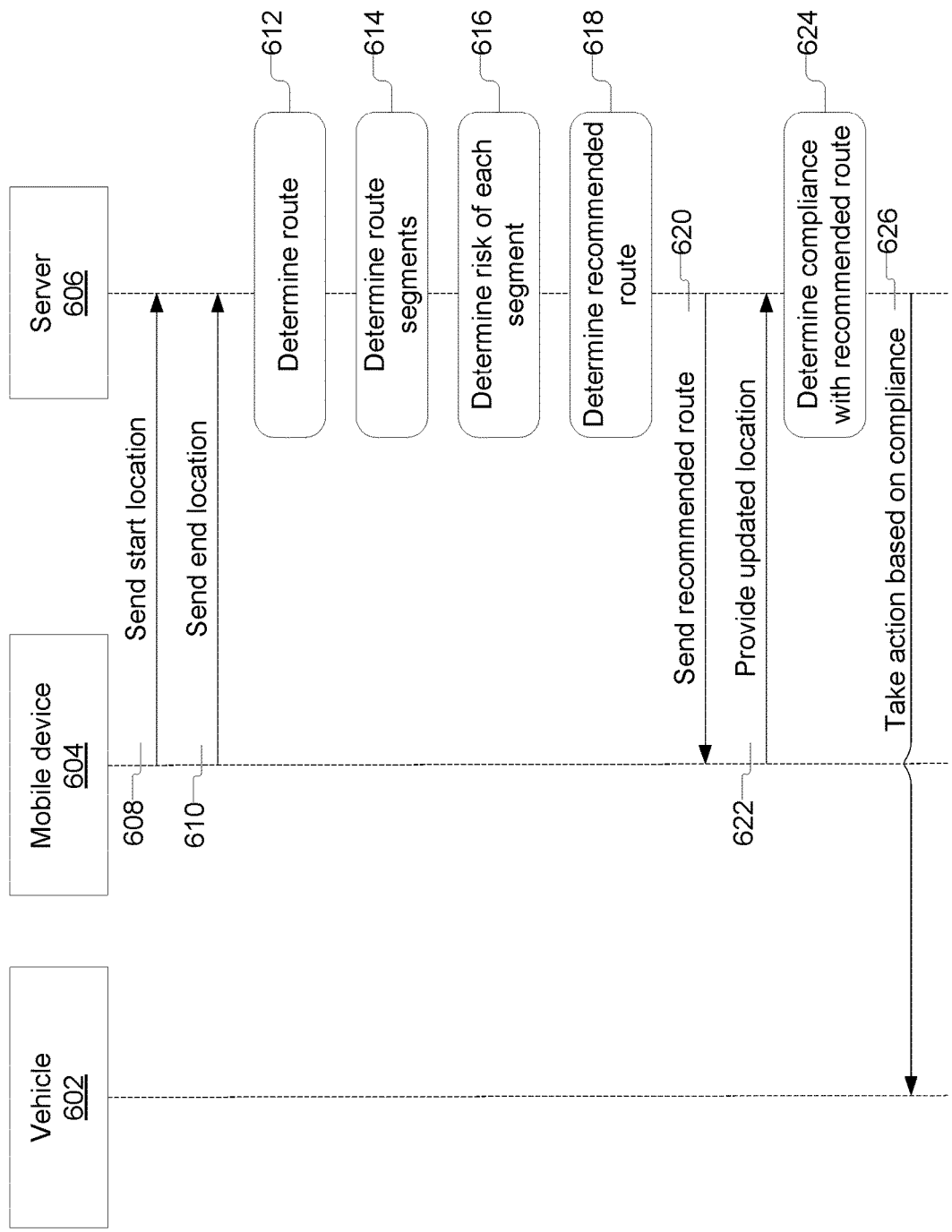
FIG. 6 is an illustrative flow diagram according to at least one embodiment described herein.

FIG. 6 depicts an illustrative flow diagram for evaluating risk. As depicted in FIG. 6, a system may include one or more of vehicle 602, mobile device 604, and server 606. FIG. 6 depicts mobile device 604 and server 606 communicating, but in some embodiments, mobile device 604 and/or server 606 may be part of vehicle 602. Thus, any of the steps described in connection with FIG. 6 may be performed wholly or in part by one or more of vehicle 602, mobile device 604, and server 606. Furthermore, one or more steps may be omitted, replaced, reordered, or supplemented with other steps.

In step 608, mobile device 604 may send a start location to server 606. For example, the mobile device may be located in or near vehicle 602, and may transmit a location of mobile device 604 and/or vehicle 602.

In step 610, mobile device 604 may send an end location. For example, mobile device 604 may send a destination location that is desired for driving vehicle 602 to. In another embodiment, the server 606 may itself generate the end location, or receive the end location from another device (e.g., a fleet management system).

In step 612, server 606 may determine one or more routes from the start location to the end location. For each route, server 606 may, in step 614, determine route segments. The server may also, for each route, in step 616, determine the risk of each segment, and the total risk of each route. Server 606 may use one or more factors, such as one or more of the factors described in connection with FIG. 4, for determining risk.

In step 618, server 606 may determine a recommended route from among the potential routes. The recommended route may be determined using a route optimization equation. The route optimization equation may include one or more factors, such as the factors discussed in connection with FIG. 5. In some embodiments, there might only be one route. Server 606 might recommend that route, or, in some embodiments, might not recommend any route (e.g., recommend not driving from the start location to the end location).

In step 620, server 606 may send the recommended route to mobile device 604 and/or vehicle 602. Vehicle 602, which may have mobile device 604 inside (e.g., the driver or a passenger of vehicle 602 is carrying mobile device 604), may be driven according to the recommended route, or according to a different route.

In step 622, mobile device 604 may provide an updated location (e.g., a current location) of mobile device 604 and/or vehicle 602. For example, as vehicle 602 is driving, mobile device 604 may provide regular or irregular updates to server 606 regarding the current location of mobile device 604 and/or vehicle 602. In some embodiments, vehicle 602 may have an independent location tracking system installed (e.g., a GPS tracking device, an anti-theft tracking device, or the like), which may provide server 606 with updated locations of vehicle 602.

In step 624, server 606 may determine compliance of vehicle 602 with the recommended route (e.g., the route recommended in step 618). Server 606 may determine compliance based on the location of mobile device 604 and/or vehicle 602, which may have been received in step 622.

In step 626, server 606 may cause an action to be taken based on compliance or noncompliance with the recommended route. For example, if vehicle 602 is not on the recommended route, server 606 may send a signal to vehicle 602 to activate an autonomous (e.g., self-driving) function of vehicle 602, which may drive until vehicle 602 rejoins the recommended route or reaches the end location. In another example, server 606 may send a signal to limit a speed of vehicle 602 until the vehicle returns to the recommended route. Alternatively or additionally, server 606 may disable the vehicle completely (e.g., stop the vehicle). Alternatively or additionally, server 606 may send a signal to vehicle 602 and/or mobile device with a message to alert a driver or passenger in vehicle 602 and/or a user of mobile device 604 that vehicle 602 is not on the recommended route. For example, a message to a driver may notify a driver that the driver may be docked in pay, be reported, or otherwise receive a consequence for not following a recommended route. Alternatively or additionally, an insurance premium associated with vehicle 602 may be adjusted up or down based vehicle 602 following or not following the recommended route.

In some embodiments, one or more actions may be taken based on compliance or non-compliance with the recommended route. The actions described here are not comprehensive, but merely illustrative of actions that may be taken in response to a vehicle following a recommended route (e.g., a route recommended at least in part based on risk).

FIGS. 7A-7H depict illustrative graphical user interface screens for various screens that may be part of an illustrative application for assisting a user in determining risk and taking action related to the risk. The application may be operated as part of a system, which may be in communication with one or more remote computers for determining risk and/or recommended routes. For example, the application may operate on a mobile device, a laptop, a computer, a vehicle, a server, or the like.

Figure 7A:
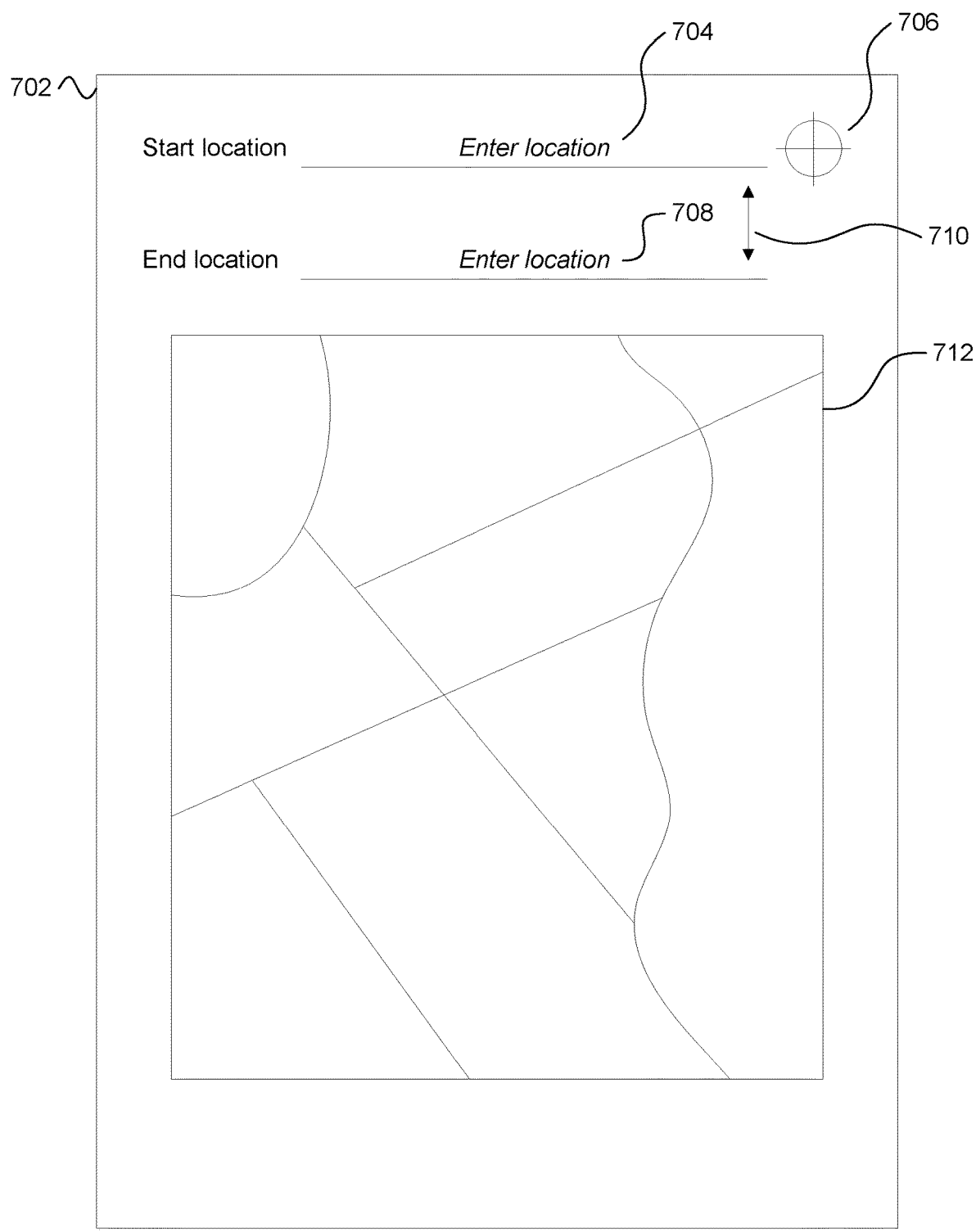
FIGS. 7A-7H are illustrative diagrams of graphical user interfaces according to at least one embodiment described herein.

FIG. 7A depicts an illustrative screen (e.g., screen 702) for receiving a start location and an end location from a user. The application may receive a start location in entry field 704, and may receive an end location in entry field 708. The application may receive start location and/or end location via interaction (e.g., press and hold) with a map (e.g., map 712). The application may allow for a location (e.g., a start location) to be set to a current location of the device executing the application (e.g., by pressing icon 706). The application may allow for swapping an end location and a start location (e.g., by pressing icon 708), which may result in the location in entry field 704 (if any) being placed in entry field 708, and the location in entry field 708 (if any) being placed in entry field 704.

Figure 7B:
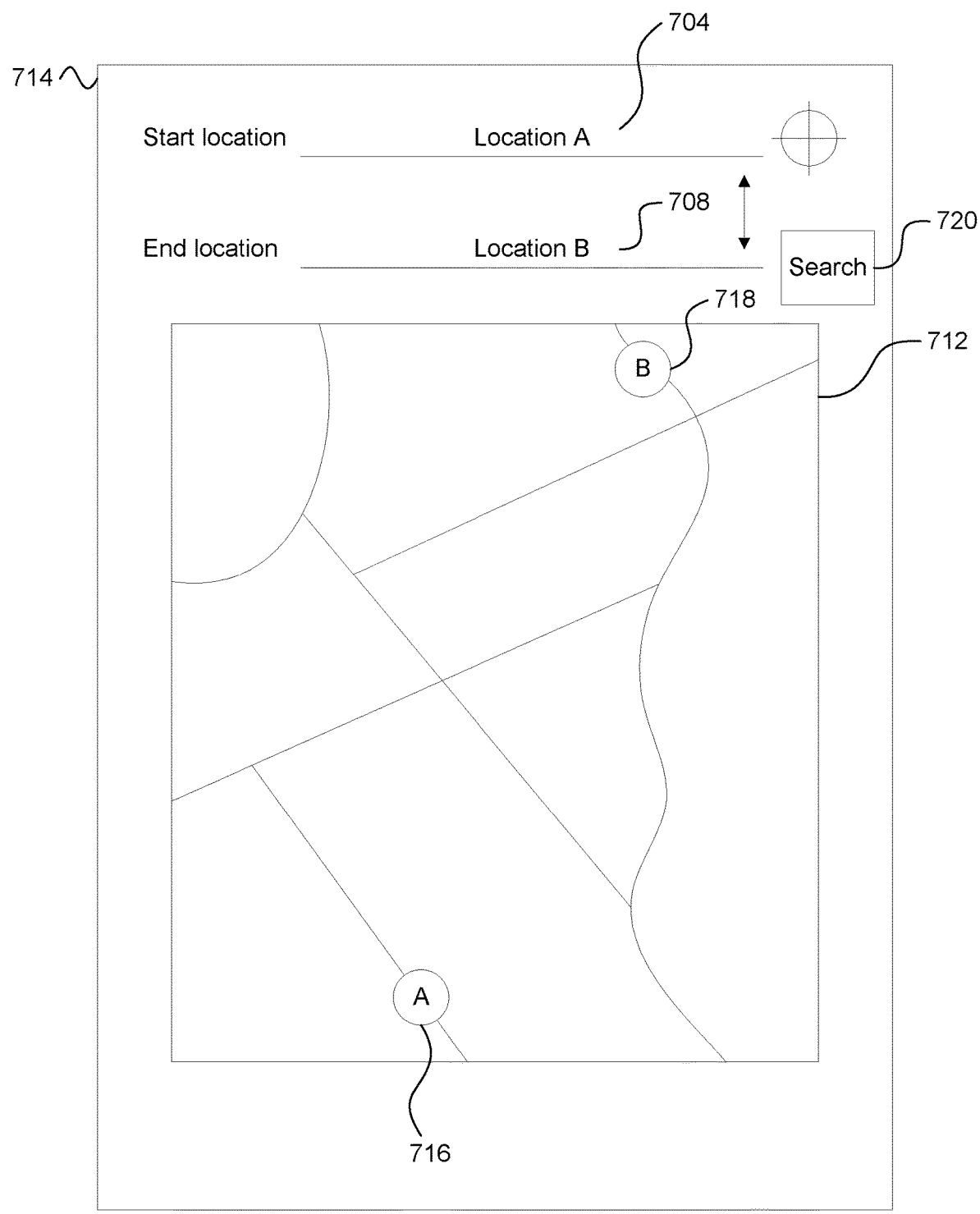

FIG. 7B depicts an illustrative screen (e.g., screen 714) that may be displayed after a start location and end location is received. For example, an entered start location may be displayed in entry field 704 after the start location is entered. Entered end location may be displayed in entry field 708 after the end location is entered. After start and end locations are entered, a search box (e.g., search box 720) may be displayed and/or activated.

Map locations may be displayed, which may correspond to entered locations. For example, location indicator 716 may correspond to a location of the start location on map 712. Location indicator 718 may correspond to a location of the end location on map 712.

Figure 7C:
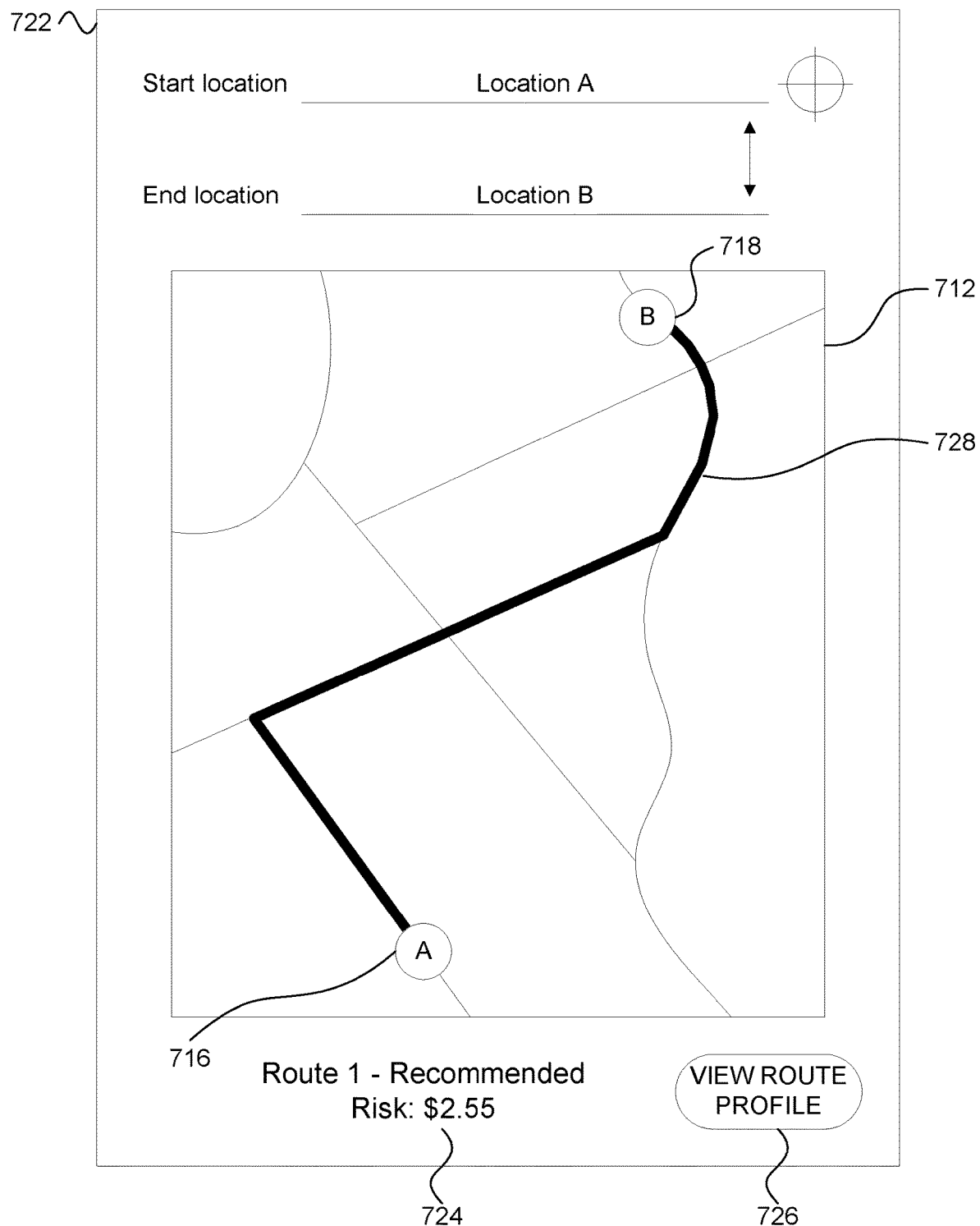

FIG. 7C depicts an illustrative screen (e.g., screen 722) that may be displayed after a search is performed for one or more routes. One or more routes between a start location and an end location (e.g., a route between location indicator 716 and location indicator 718) may be displayed on map 712. In the depicted example, a first route 728 may be depicted.

Information associated with the first route may be displayed below or near the map. For example, route information 755 may describe whether the route is a recommended route, a risk of the route (e.g., a risk as measured in dollars, a risk as measured in risk score, etc.). The application may include a button (e.g., button 726) that, when pressed, may cause a route profile screen to be displayed.

Figure 7D:
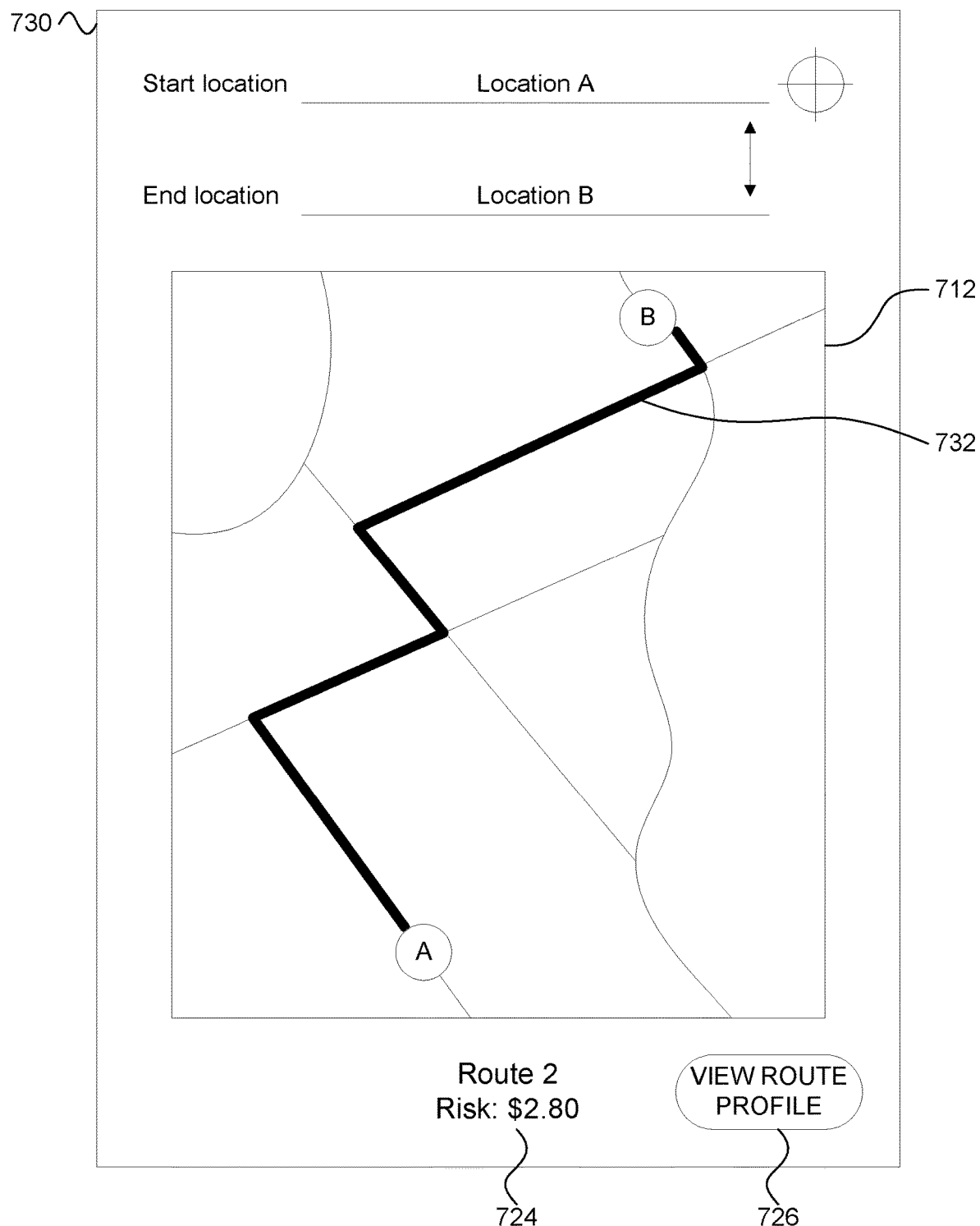

FIG. 7D depicts an illustrative screen (e.g., screen 730) that may be displayed after a search is performed for one or more routes, and shows a different route than the route depicted in FIG. 7C. In the depicted example, a route (e.g., route 732) between a first location and a second location may be displayed on a map (e.g., map 712). Route information 724 about route 732 may be displayed near map 712.

Figure 7E:
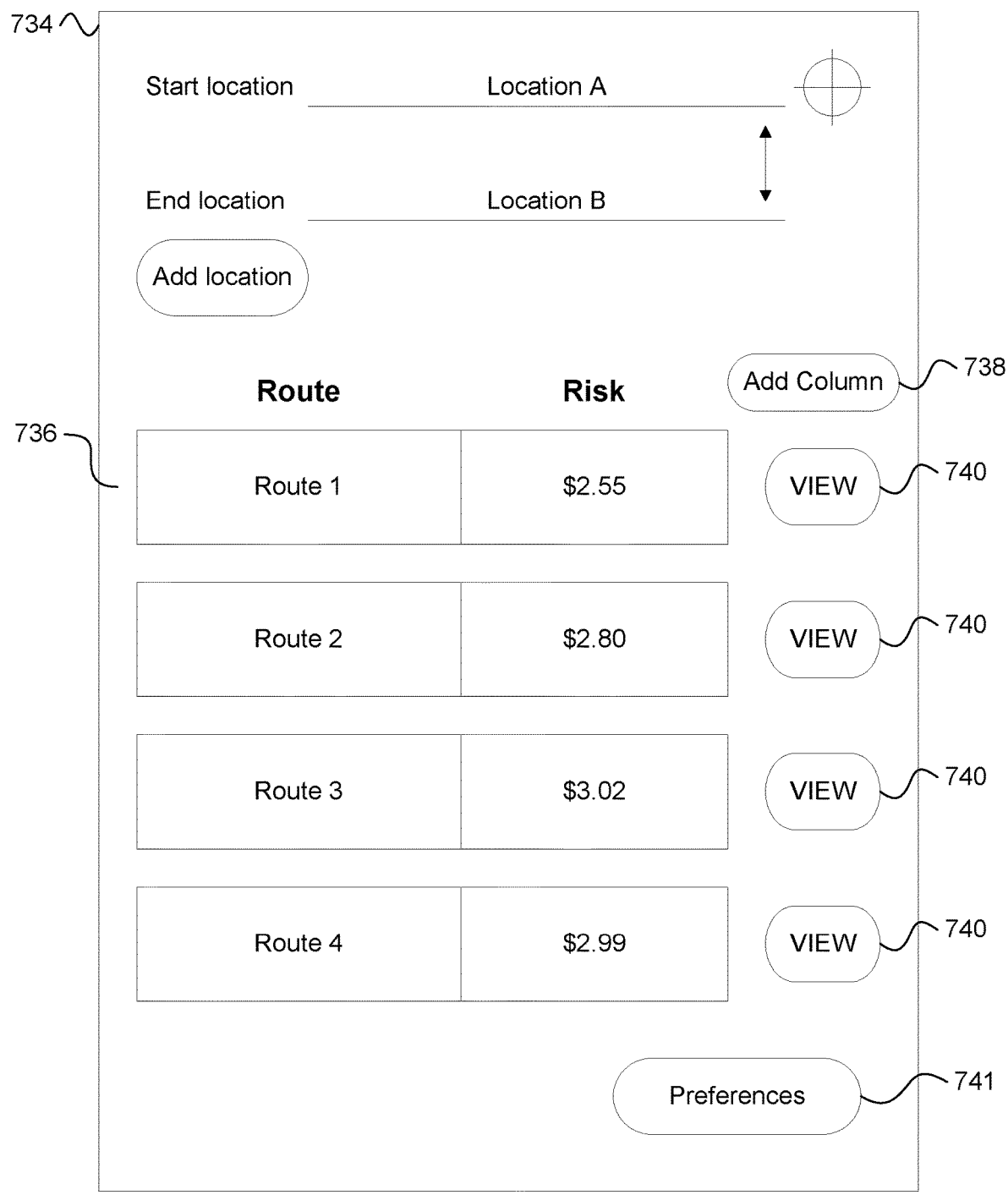

FIG. 7E depicts an illustrative screen (e.g., screen 734) that may be displayed in response to a search for routes between a first location and a second location. Screen 734 may include a list (e.g., list 736) of potential routes. List 736 may include information about each route, including risk associated with each route. The application may provide for displaying additional information about each route in list 736, which may be activated by pressing a button (e.g., button 738) to add a column to the list, the column having additional information related to each route.

The application may also include one or more buttons (e.g., buttons 740), which may, when pressed, cause display of a screen with details about a route (e.g., similar to screen 722, screen 730).

The application may allow a user to enter one or more preferences, which may be accessed through one or more parts of the application (e.g., by pressing a button, such as button 741). A user preference input may allow a user to create or maintain one or more driver profiles. The preferences may allow for an association to be created between one or more vehicles and one or more drivers. The preferences may allow for inputting information regarding a vehicle and/or driver associated with a fleet.

The user preferences may be used by the application to determine risk, to make route recommendations, or the like. For example, in making route recommendations, the application may take the user's preferences into account. In some embodiments, there may be limits to which the user's preferences are taken into account. For example, if a user always values time over safety (e.g., two routes could be safe, but one route might be 95% safe and another might be 98% safe. The 95% safe route might take 10 minutes, and the 98% safe route might take 30 minutes), the system might take the user's preferences into account and choose a route that takes less time, even if the route is slightly less safe. But as noted earlier, the application might only take the user's preferences into account up to a threshold. For example, if a route is 50% safe, and takes 10 minutes, versus a route that is 95% safe, and takes 15 minutes, the application might still choose the 95% safe route, even if a user typically prefers time over safety, because the safety might be too low (e.g., below a safety threshold, such as 80%).

Figure 7F:
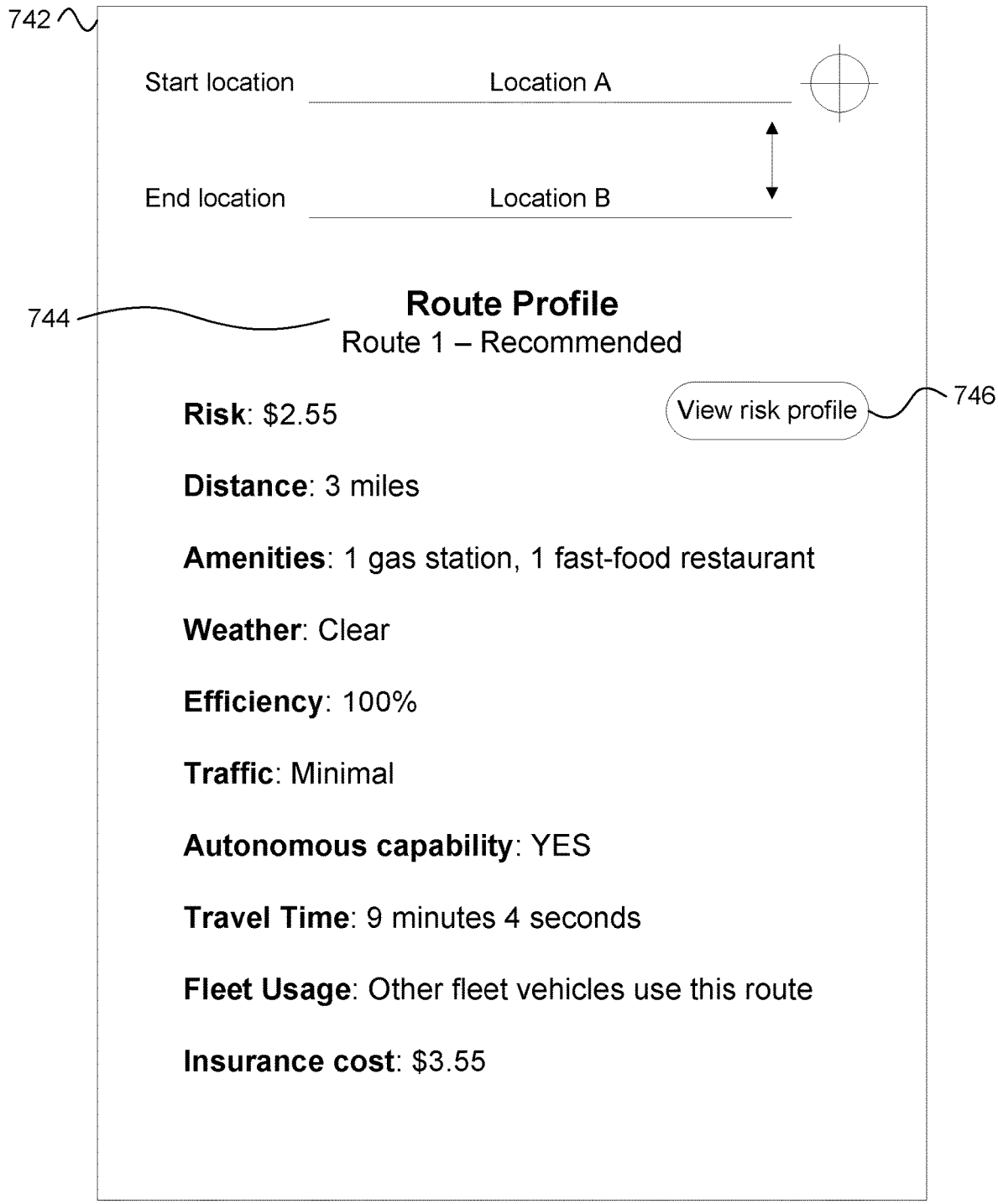

FIG. 7F depicts an illustrative screen (e.g., screen 742) that may be displayed in response to a button (e.g., button 726) being pressed. The application may include a route profile screen, which may include information about a route (e.g., route information 744). Route information may include one or more details about a route. For example, route information may include a risk score or risk amount, a route distance, a listing of amenities available along the route, a weather forecast for the route, an efficiency rating, a traffic prediction, whether autonomous functionality of a vehicle is available on the route, an estimated travel time of the route, information regarding fleet usage of the route, and an insurance cost for driving the route. More or less information may be displayed as part of the route information. The application may include a button (e.g., button 746) that, when pressed, may cause display of a screen with a risk profile of the route.

Figure 7G:
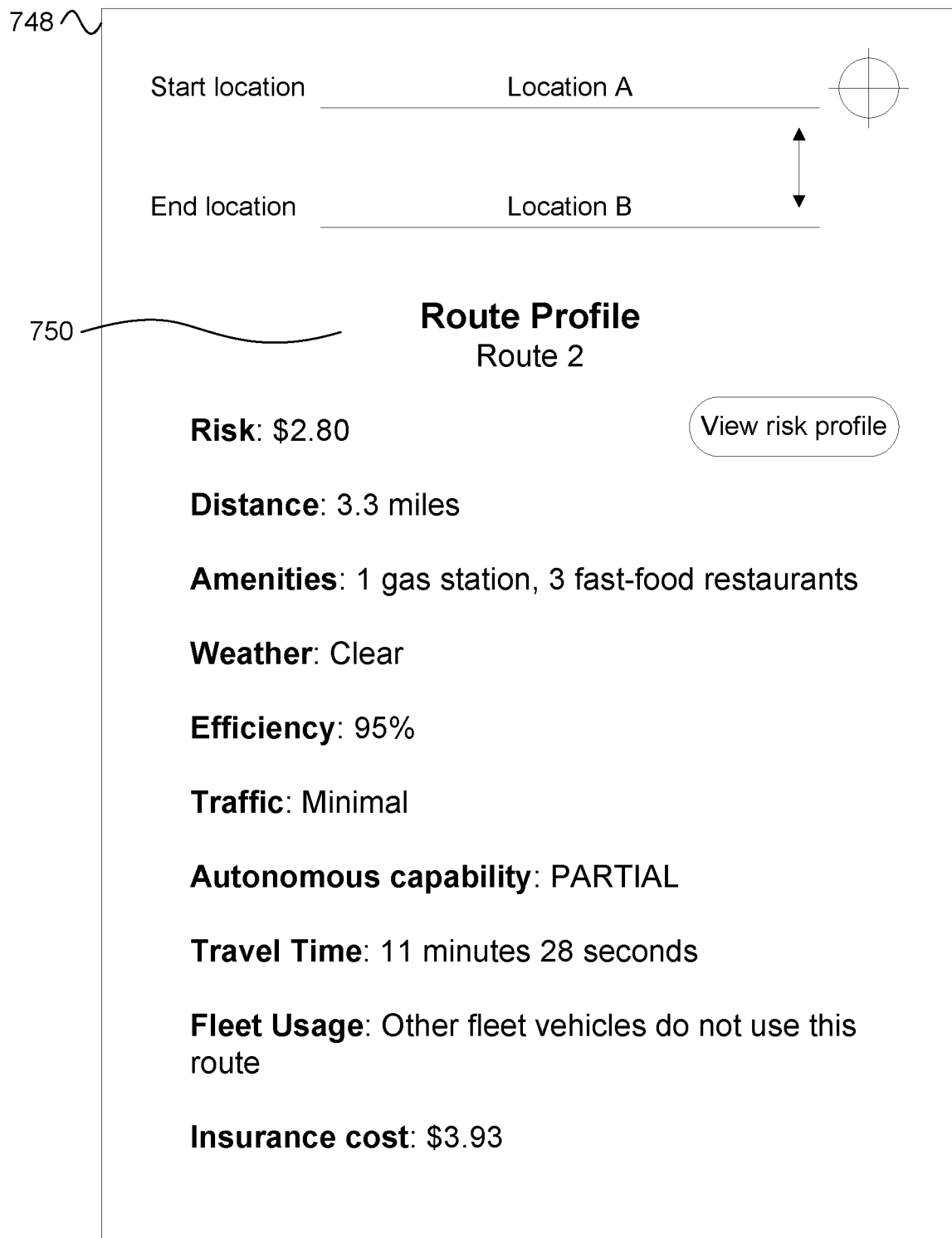

FIG. 7G depicts an illustrative screen (e.g., screen 748) that may be displayed in response to a button being pressed. FIG. 7G depicts an illustrative route profile screen for a different route, and includes different illustrative route information 750 that may be displayed, the different route information 750 being related to a different route (e.g., route 732).

Figure 7H:
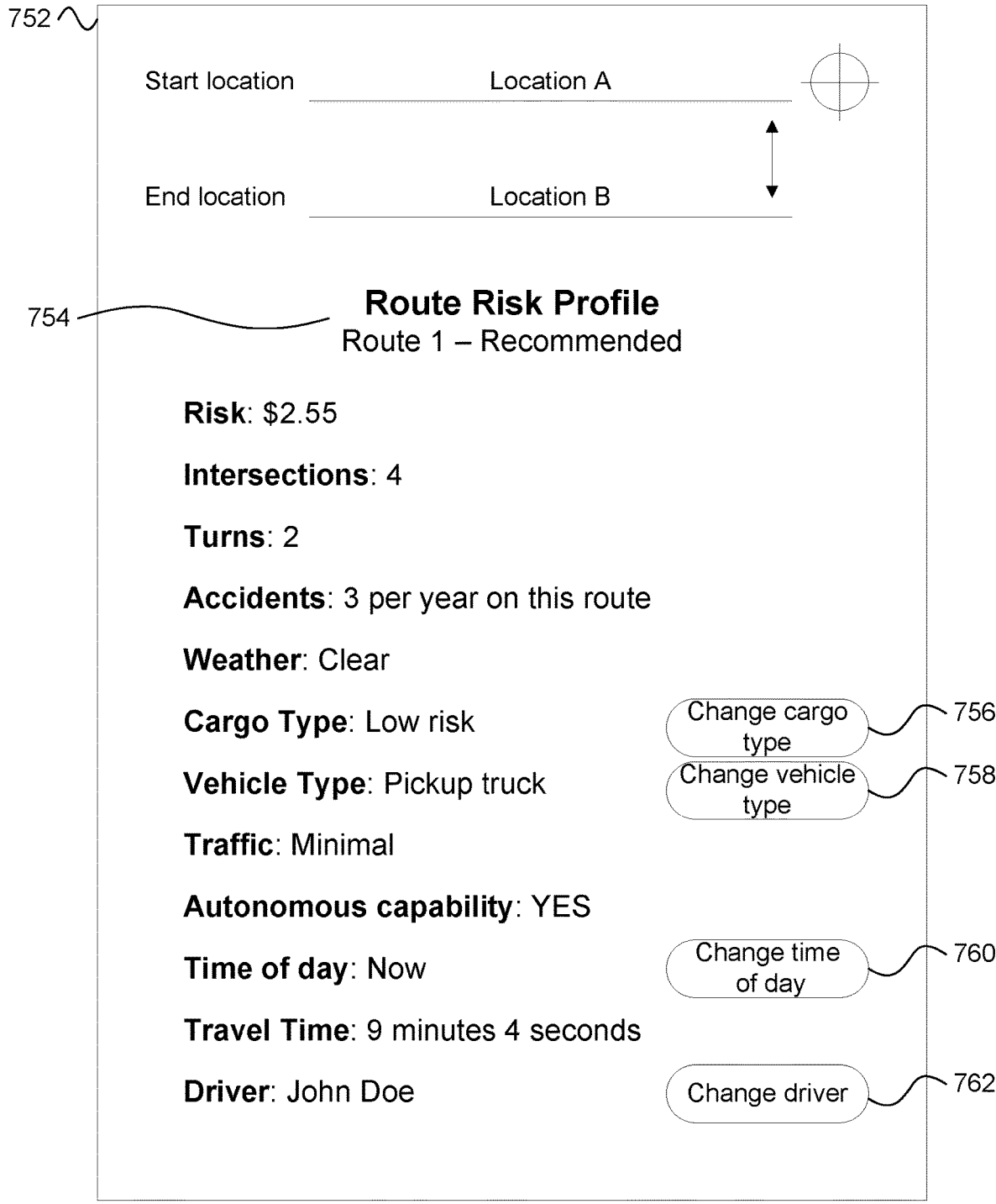

FIG. 7H depicts an illustrative screen (e.g., screen 752) that may be displayed in response to a button (e.g., button 746) being pressed. The application may include a risk profile screen, which may include information (e.g., risk information 754) about risk factors that may be used or have been used to calculate risk for a particular route. For example, risk information 754 may include a total amount of risk for a route, a number of intersections, a number of turns, a typical number of accidents, a weather forecast, a cargo type, a vehicle type, a traffic prediction, whether autonomous functionality of a vehicle is available on the route, an estimated time of day for driving on the route, an estimated travel time, and a driver.

The application may include one or more buttons or other input methods for adding, removing, or updating information being used for making a risk prediction. In some embodiments, this updated information is sent to a server. In some embodiments, updated information for calculating risk may be stored locally on the machine or device executing the application. Thus, if a network connection is not available, the device may still be able to calculate a risk score.

For example, in some embodiments, button 756 may allow for a user to change a cargo type of cargo being carried in a vehicle on a trip. In some embodiments, the cargo type may be specifically selectable (e.g., plastic, toys, hardwood, etc.). In other embodiments, a risk level may be selected (e.g., low, medium, high), which may allow a user to provide an estimated risk level for a particular vehicle. One or more elements of a route risk profile and/or a route recommendation may be recalculated based on the cargo type being changed.

In some embodiments, the application may include a button (e.g., button 758) to allow a user to change a vehicle type of a vehicle being taken on a trip. For example, a vehicle type may be a car, a truck, a pickup truck, a semi-truck, a cargo van, an armored car, a box van, a box truck, a sports car, a dune buggy, a go-kart, an antique or classic car, a delivery truck, an ice-cream truck, a mail truck, heavy equipment (e.g., a bulldozer, backhoe, road grater, or the like), or another type of vehicle. The application may allow for entry of a specific make and model, and the application may automatically classify the vehicle into a particular vehicle category. The application may provide for selection of one of many specific vehicle categories, or the application may provide for selection of one of a few broad vehicle categories. One or more elements of a route risk profile and/or a route recommendation may be recalculated based on the vehicle type being changed.

In some embodiments, the application may include a button (e.g., button 760) to allow a user to change a time of day for a trip. For example, the application may allow a user to indicate if the user is currently on a trip, is leaving now, or is leaving within a threshold period of time (e.g., within the next five minutes, within the next 30 minutes, within the hour, sometime today, sometime this week, sometime this month, sometime this year, or the like). Alternatively, the time of day entry may be a specific time (e.g., 6:04) or more general (e.g., select an hour (e.g., 6:00, 7:00, 8:00), select a half hour (e.g., 6:00, 6:30, 7:00), or the like). The application may provide different risk information and/or route recommendation based on a different time of day. In some embodiments, the system may provide a recommended time of day with or instead of a recommended route (e.g., if a user wants to take a trip sometime today, the application may recommend a first route at a first time of day, a second route at a second time of day, etc.).

In some embodiments, the application may include a button (e.g., button 762) to allow a user to change a driver for a trip. For example, the user may select from one of a number of users associated with a particular vehicle, insurance plan, fleet, company, household, or the like. In some embodiments, the user may provide information to add a new driver to the system. The application may update a route risk profile and/or a recommended route based on a driver for a trip. In some embodiments, the application may recommend a particular driver for a particular segment of a trip, and/or a particular driver for a particular route. For example, the application may recommend a first driver for a first route, and/or a second driver for a second route.

In some embodiments, the application may allow for a user to view (e.g., FIGS. 7F-7H) and/or select one or more characteristics of a route. The user may select characteristics that the user values on a particular trip, or the user may select characteristics to add to the user profile for valuing more highly in all trips taken by that user. The application may allow the user to select one or more characteristics to add or exclude from a particular route evaluation, and request a new route evaluation based on the added or excluded characteristics. Similarly, the application may allow a user to weight certain characteristics more or less heavily, and request a new route recommendation based on the re-weighted characteristics.

Figure 8:
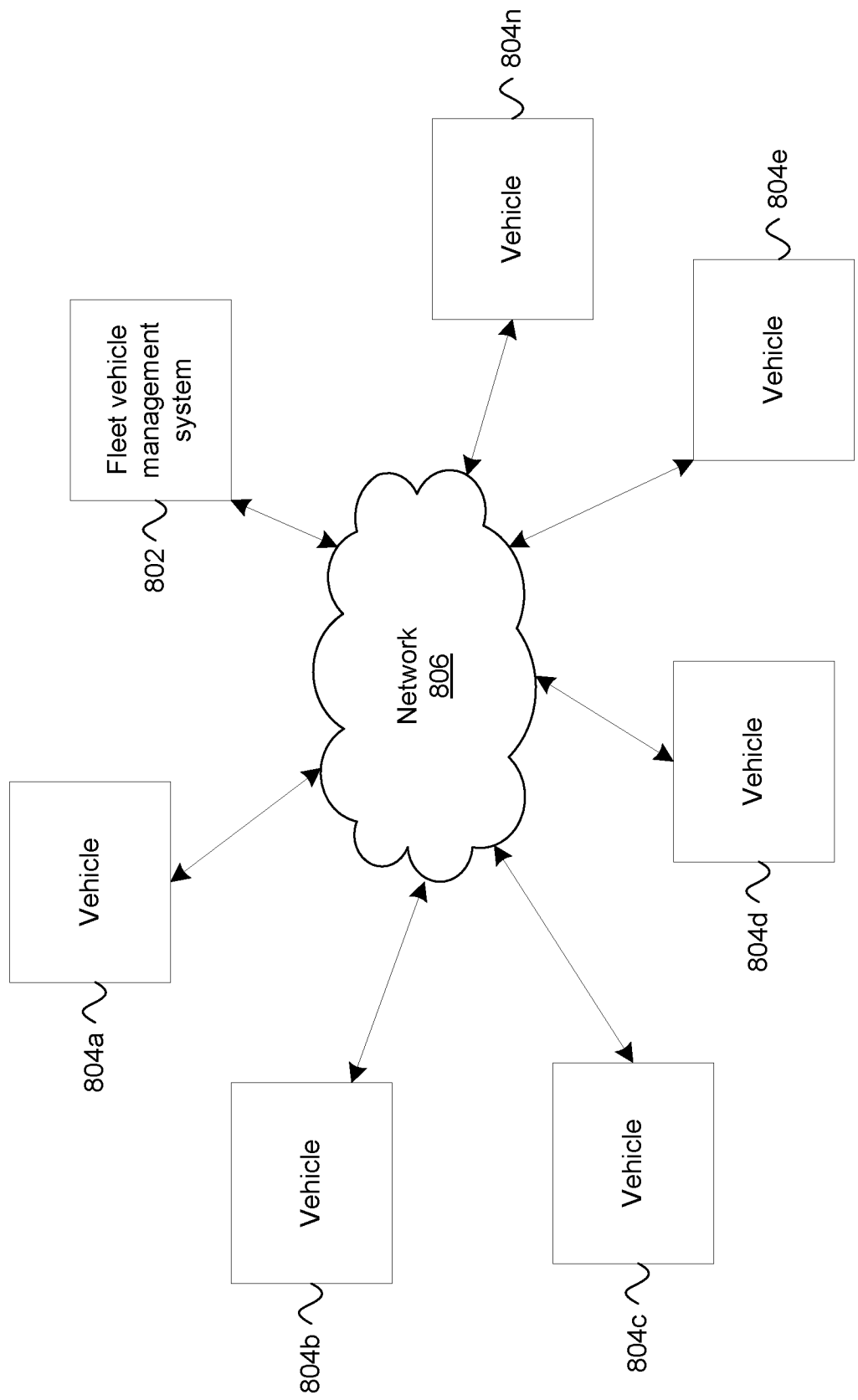
FIG. 8 is an illustrative diagram of an environment in which routes for fleet vehicles may be determined according to at least one embodiment described herein.

FIG. 8 depicts an illustrative block diagram of an environment for fleet management of vehicles. The environment may include one or more fleet vehicle management systems (e.g., fleet vehicle management system 802). The environment may include one or more vehicles (e.g., vehicle 804a, vehicle 804b, vehicle 804c, vehicle 804d, vehicle 804e, vehicle 804n, etc.). The one or more fleet vehicle management systems may be connected to the one or more vehicles via one or more networks (e.g., network 806).

Fleet vehicle management system 802 may include one or more devices for managing fleet vehicles. For example, fleet vehicle management system 802 may include one or more computers, servers, and the like, which may perform tasks related to managing one or more fleet vehicles (e.g., determining preferred routes for vehicles, assigning tasks for vehicles to perform, tracking maintenance for vehicles, and the like).

Fleet vehicle management system 802 may perform one or more of the aspects described herein. For example, fleet vehicle management system may consider the risk of different routes and use that risk in a route optimization equation. Some route optimization equations may use a dollar amount as a measure of cost for a selected route. The risk variable may be calculated as a dollar amount and can be used in the route optimization equation. Individual factors of each driver may be included in the risk analysis and the route optimization equation. The individual factors can be dynamic, such that the individual route optimization can change for a particular individual, depending on the current state of the dynamic individual risk factors.

Fleet vehicle management system 802 may predict the risk of a route right now, in 30 minutes, or an hour, or another amount of time, and this information can be used in determining when and where a fleet should travel.

Fleet vehicle management system 802 may interface with an application (e.g., an application running on a mobile device of a user—e.g., a driver of a fleet vehicle). The application may include one or more features similar to the application described in connection with FIGS. 7A-7H. The application may show the driver the risk characteristics of different routes (by color or words or the like). The driver can then use the risk characteristics to assist in choosing the route.

The risk of a route may have an impact on the fleet management. For example, a risk-adjusted UPI may be used for providing insurance to fleet vehicles. The fleet may have an insurance rate applied to a group of vehicles (e.g., grouped by owner, driver profile, geographic area, etc.). Some insurance rates may be applied differently, depending on different factors (e.g., driving more miles might result in different monthly costs based on certain factors, rather than miles based).

In addition to determining a risk value for routes, fleet vehicle management system 802 may provide a "yes" or "no" for particular routes. Depending on the risk analysis, fleet drivers may not be allowed to drive particular routes. If the driver drives a prohibited route, actions can be taken against the driver. In another example, a driver is provided limited functions for different routes. For example, for route A there is no speed limitation, for route B the car limits the driver's speed to 40 mph. These limitations on drivers also can be applied to autonomous cars.

Fleet management system 802 may identify a driver based on a driver profile. Some drivers may have more risk than others. In some embodiments, fleet management system 802 may identify drivers with a higher risk score, and only perform route management and/or vehicle feature activation/deactivation for those drivers. For example, if a driver's risk score is above a certain threshold, fleet management system 802 may determine a recommended route, activate/deactivate a feature of the vehicle, and/or take action if the vehicle is not following a recommended route.

Fleet management system 802 may track an amount of time a driver has been driving. Some laws may say that after a certain amount of time (and/or one or more other factors), the driver is no longer allowed to drive. As a driver's percentage or amount of time driving in recent time (e.g., a rolling 24 hour period) increases, the risk evaluation of different routes may change. As the risk changes, some routes may no longer be available. For example, as a driver drives for more time in a certain time period, the driver may no longer be allowed to take certain routes. For example, fleet management system 802 may recommend routes with rest areas, so as to avoid a driver taking a longer route or a route without a rest area. Fleet management system 802 may determine that a driver is allowed to continue on a particular route under certain conditions (e.g., the driver may drive at 45 miles per hour instead of 70 miles per hour).

Fleet management system 802 may provide one or more benefits to fleet owners. For example, costs may be reduced, including costs related to accidents, delays, driver downtime, unavailability of equipment (e.g., truck is broken), and/or avoidance of issues with a next trip for a fleet vehicle. Notably, different organizations may value delay, damage, or other issues with fleet vehicles differently. By considering risk, damage, delay, driver downtime, driver overtime, and other considerations using a normalized factor for comparison (e.g., representing each factor in dollar amount), the fleet management system may weigh each factor according to its value to the organization that owns, manages, or uses the fleet, to meet the distinct needs of that organization.

Some fleet costs and/or savings may be significant, especially when considered in contrast with individually owned or managed vehicles. For example, if the costs of risk for two different routes for a trip made by a vehicle are $0.64 versus $0.94, the individual vehicle owner/manager might not care about the cost of risk as much as a different factor (e.g., time, safety, etc.). But minimizing the cost of risk for a trip for a vehicle, when multiplied by dozens or hundreds or thousands of vehicles driving hundreds or thousands or millions of miles a year, may have a significant impact on an organization with a fleet of vehicles. For example, by recommending and/or enforcing routes and/or speeds to maximize fuel efficiency (e.g., recommending a route with a speed limit of 55 miles per hour instead of 80 miles per hour), the fleet may achieve significant cost savings by increasing the average fuel economy of fleet vehicles, based on those vehicles driving at a more fuel-efficient speed. In another example, by optimizing certain factors, risk, routes, etc., fleet management system 802 may improve cost savings by reducing driver drive time, asset (e.g., vehicle) wear and tear, and the like.

One or more of the fleet vehicles may include one or more computing devices that may send information to and/or receive information from the fleet vehicle management system.

As noted earlier, the environment also may include one or more networks (e.g., network 806), which may interconnect one or more of fleet management system 802 and vehicles 804*a-n*, as depicted in FIG. 8. Network 806 may include one or more sub-networks (e.g., local area networks (LANs), wide area networks (WANs), or the like). Network 806 may be associated with a particular organization (e.g., a corporation, educational institution, governmental institution, or the like) and may interconnect one or more computing devices associated with the organization. Network 806 may be a home network, a corporate network, an ad-hoc network, a ring network, or another type of network. Network 806 may be the Internet.

For example, a mobile device of a user (e.g., mobile device 104) may be configured to execute one or more computer-executable applications. The one or more computer-executable applications may be installed on a mobile device of the user. The one or more computer-executable applications may be downloaded to the mobile device from an public or private application store or catalog, may be directly installed onto the mobile device, and/or may be installed using a mobile device management system. The one or more computer-executable applications may work with all of the features described herein, or may work with a subset of the features.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method of activating and deactivating one or more features of a fleet vehicle of a fleet comprising a plurality of fleet vehicles, the method comprising:

determining, by a computing device comprising a processor and memory, a driving route of the fleet vehicle of the fleet comprising the plurality of fleet vehicles, the driving route being from a starting location to a destination location;

receiving, by the computing device, from a global positioning system in the fleet vehicle, route information of the fleet vehicle indicating that the fleet vehicle is no longer at the starting location and is adhering to the driving route;

determining, by the computing device, that a feature of the fleet vehicle is deactivated; and after receiving the route information of the fleet vehicle and determining that the feature of the fleet vehicle is deactivated, causing, by the computing device, activation of the feature of the fleet vehicle based on determining that the fleet vehicle is adhering to the driving route.

2. The method of claim 1, wherein the fleet vehicle includes autonomous or semi-autonomous functionality, and wherein causing the activation of the feature of the fleet vehicle comprises at least one of:
   activating a speed limiter of the fleet vehicle,
   activating a brake of the fleet vehicle,
   activating an accelerator of the fleet vehicle,
   activating a self-driving function of the fleet vehicle,
   turning on a radio of the fleet vehicle,
   turning off the radio of the fleet vehicle,
   turning on hazard lights of the fleet vehicle,
   activating a traction control system of the fleet vehicle,
   turning the fleet vehicle, or
   disabling the fleet vehicle.

3. The method of claim 2, wherein causing the activation of the feature of the fleet vehicle comprises at least activating the speed limiter of the fleet vehicle, and wherein activating the speed limiter of the fleet vehicle comprises activating a device that limits a rotational speed of an engine of the fleet vehicle.

4. The method of claim 2, wherein a road on the driving route comprises at least one sensor or transmitter configured to communicate with an onboard computer of the fleet vehicle, the at least one sensor or transmitter supporting the autonomous or semi-autonomous functionality of the fleet vehicle.

5. The method of claim 1, wherein causing the activation of the feature of the fleet vehicle comprises:
   transmitting, by the computing device, via a cellular network, to a different computing device that is part of the fleet vehicle, an instruction to activate the feature of the fleet vehicle.

6. The method of claim 1, comprising:
   determining a risk score for each segment of a plurality of segments along the driving route, the risk score for each segment corresponding to a dollar amount of risk associated with the segment; and
   determining a total risk of the driving route from the starting location to the destination location, the total risk being a sum of the risk score for each segment of the plurality of segments, and the total risk of the driving route corresponding to a total dollar amount of risk associated with the driving route,
   wherein activating the feature of the fleet vehicle comprises activating the feature of the fleet vehicle based on the total risk of the driving route being below a threshold value.

7. The method of claim 6, comprising:
   determining a different driving route from the starting location to the destination location, the different driving route comprising a different plurality of segments, at least one segment of the different plurality of segments being different from at least one segment of the plurality of segments along the driving route.

8. The method of claim 7, comprising:
   determining a risk score for each segment of the different driving route; and
   determining a total risk of the different driving route, the total risk of the different driving route being a sum of the risk score for each segment of the different driving route, and the total risk of the different driving route corresponding to a total dollar amount of risk associated with the different driving route.

9. The method of claim 8, comprising:
   determining, based on the total dollar amount of risk associated with the driving route and the total dollar amount of risk associated with the different driving route, whether the driving route or the different driving route has a lower amount of risk; and
   based on whether the driving route or the different driving route has the lower amount of risk, providing a recommended route for the fleet vehicle from the starting location to the destination location, the recommended route having the lower amount of risk.

10. The method of claim 6, comprising:
    determining a current risk score for the driving route based on the fleet vehicle departing the starting location at a current time;
    determining a future risk score for the driving route based on the fleet vehicle departing the starting location at a future time after the current time; and
    providing the current risk score and the future risk score for display.

11. The method of claim 6, comprising:
    determining a first risk score for a first potential driver of the fleet vehicle for the driving route;
    determining a second risk score for a second potential driver of the fleet vehicle for the driving route; and
    recommending a driver for the fleet vehicle for the driving route, based on the first risk score for the first potential driver and the second risk score for the second potential driver.

12. The method of claim 6, wherein determining the risk score for each segment is based on at least one of a type of the fleet vehicle, a type of cargo in the fleet vehicle, traffic conditions of the segment, a time of day that the fleet vehicle will be in the segment, or weather conditions of the segment.

13. The method of claim 6, comprising:
    determining a number of turns along the driving route, wherein determining the total risk of the driving route is based on the number of turns along the driving route.

14. The method of claim 6, comprising:
    determining a different total risk of each of a plurality of different potential driving routes for a plurality of fleet vehicles comprising the fleet vehicle; and
    based on at least one factor associated with the plurality of fleet vehicles, providing a respective recommended route for each of the plurality of fleet vehicles.

15. The method of claim 6, comprising:
    generating for display a risk profile of the driving route, the risk profile comprising details of one or more factors contributing to the total risk of the driving route.

16. The method of claim 15, comprising:
    determining a plurality of different potential driving routes;
    determining a corresponding total risk for each of the plurality of different potential driving routes;

eliminating at least one of the plurality of different potential driving routes based on the corresponding total risk of the at least one of the plurality of different potential driving routes being above the threshold value; and receiving a selection of one of the plurality of different potential driving routes.

17. The method of claim 6, comprising:

generating for display information regarding the driving route, the information regarding the driving route comprising one or more of the total dollar amount of risk associated with the driving route, traffic conditions along the driving route, total travel time of the driving route, estimated fuel usage for the driving route, or road conditions of the driving route.

18. The method of claim 6, wherein determining the risk score for each segment is based on a plurality of factors, and comprises:

determining a first weight for a first factor of the plurality of factors;

determining a second weight for a second factor of the plurality of factors; and determining a weighted score based on the first weight for the first factor and the second weight for the second factor, wherein the weighted score is the risk score for the segment.

19. Non-transitory computer-readable media storing executable instructions that, when executed by at least one processor, cause a system to:

determine a starting location of a fleet vehicle of a fleet comprising a plurality of fleet vehicles, the fleet vehicle capable of at least one autonomous or semi-autonomous function;

receive a destination location for the fleet vehicle;

determine a driving route from the starting location to the destination location;

receive, from a global positioning unit in the fleet vehicle, information indicating that the fleet vehicle is no longer at the starting location and is not along the driving route; and after receiving the information indicating that the fleet vehicle is no longer at the starting location and is not along the driving route, activate the at least one autonomous or semi-autonomous function of the fleet vehicle based on the fleet vehicle not being along the driving route.

20. A system comprising:

at least one processor;

non-transitory memory storing executable instructions that, when executed by the at least one processor, cause the system to:

determine a driving route of a fleet vehicle from a starting location to a destination location;

receive location information of the fleet vehicle from a computing device in the fleet vehicle;

determine that the fleet vehicle is no longer at the starting location and is adhering to the driving route; and after receiving the location information of the fleet vehicle, activate an autonomous or semi-autonomous function of the fleet vehicle, based on a location of the fleet vehicle adhering to the driving route.

* * * * *